United States Patent
Li et al.

(10) Patent No.: US 10,911,948 B2
(45) Date of Patent: Feb. 2, 2021

(54) METHOD AND SYSTEM FOR PERFORMING NETWORK ACCESS AUTHENTICATION BASED ON NON-3GPP NETWORK, AND RELATED DEVICE

(71) Applicant: Huawei Technologies Co., Ltd., Shenzhen (CN)

(72) Inventors: He Li, Shanghai (CN); Jing Chen, Shanghai (CN); Huan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/574,899

(22) Filed: Sep. 18, 2019

(65) Prior Publication Data

US 2020/0015079 A1 Jan. 9, 2020

Related U.S. Application Data

(63) Continuation of application No. PCT/CN2017/077162, filed on Mar. 18, 2017.

(51) Int. Cl.
| | |
|---|---|
| *H04W 12/04* | (2009.01) |
| *H04W 76/25* | (2018.01) |
| *H04W 76/11* | (2018.01) |
| *H04W 12/06* | (2009.01) |
| *H04W 8/08* | (2009.01) |
| *H04W 12/10* | (2009.01) |

(52) U.S. Cl.
CPC ......... *H04W 12/0401* (2019.01); *H04W 8/08* (2013.01); *H04W 12/04033* (2019.01); *H04W 12/0609* (2019.01); *H04W 12/10* (2013.01); *H04W 76/11* (2018.02); *H04W 76/25* (2018.02)

(58) Field of Classification Search
CPC . H04W 12/0401; H04W 76/25; H04W 76/11; H04W 12/0609; H04W 12/04033; H04W 8/08; H04W 12/10
See application file for complete search history.

(56) References Cited

U.S. PATENT DOCUMENTS

| | | | | |
|---|---|---|---|---|
| 2017/0238223 | A1* | 8/2017 | Zhou ................. | H04W 36/0038 370/328 |
| 2019/0215691 | A1* | 7/2019 | Salkintzis ......... | H04W 12/1006 |
| 2020/0245284 | A1* | 7/2020 | Hans ....................... | H04W 8/12 |

FOREIGN PATENT DOCUMENTS

| | | |
|---|---|---|
| CN | 102348193 A | 2/2012 |
| CN | 106304038 A | 1/2017 |
| EP | 2166798 A1 | 3/2010 |

OTHER PUBLICATIONS

"23.502: Mobility management model for non-3GPP accesses: procedures," 3GPP SA WG2 Meeting #S2-119, S2-170739, Dubrovnik, Croatia, pp. 1-12, 3rd Generation Partnership Project, Valbonne, France (Feb. 13-17, 2017).

(Continued)

*Primary Examiner* — Nam T Huynh
(74) *Attorney, Agent, or Firm* — Leydig, Voit & Mayer, Ltd.

(57) ABSTRACT

Embodiments of the present invention disclose a method and a system for performing network access authentication based on a non-3GPP network, and a related device. In the solutions of this application, steps in a non-3GPP-based network access authentication procedure in the prior art are reduced, and the UE can quickly access the network.

8 Claims, 18 Drawing Sheets

(56) References Cited

OTHER PUBLICATIONS

"Reuse anchor key for fasting untrusted non-3GPP access," 3GPP TSG SA WG3 (Security) Meeting #86Bis, Busan, Korea, S3-170682, pp. 1-3, 3rd Generation Partnership Project, Valbonne, France (Mar. 27-31, 2017).

* cited by examiner

METHOD AND SYSTEM FOR PERFORMING NETWORK ACCESS AUTHENTICATION BASED ON NON-3GPP NETWORK, AND RELATED DEVICE

CROSS-REFERENCE TO RELATED APPLICATIONS

This application is a continuation of International Application No. PCT/CN2017/077162, filed on Mar. 18, 2017, the disclosure of which is hereby incorporated by reference in its entirety.

TECHNICAL FIELD

Embodiments of the present invention relate to the field of 5G communications technologies, and in particular, to a method and a system for performing network access authentication based on a non-3GPP network, and a related device.

BACKGROUND

As communications technologies continuously develop, 3rd generation partnership project (3GPP) and non-3GPP have been deployed and used on a large scale. Particularly, use of non-3GPP such as Wi-Fi brings a user with more convenient communication service experience. In addition, as user equipment (UE) such as a mobile phone or a tablet increases on a large scale, communication is brought with new vigor, and a challenge is also posed to operation. Particularly, for a network access authentication procedure of the user equipment UE in the prior art, refer to a schematic diagram of a 5G network framework provided in FIG. 3. Each time the UE accesses a network based on non-3GPP, the UE needs to access a core network by using an untrusted non-3GPP access network and allocated IP address (trusted non-3GPP access network). In the network access authentication procedure, a signaling control plane relates to a procedure of mutual authentication between the UE and each of a non-3GPP interworking function network element (non-3GPP Interworking Function, N3IWF), an access and mobility management function network element (AMF), and an authentication server (AUSF). The entire network access authentication procedure is complex, and a relatively long authentication waiting time needs to be consumed in the authentication procedure. As a result, if the UE has successfully accessed the network last time, when the UE accesses the network again based on 3GPP/non-3GPP, the UE needs to repeat the network access authentication procedure that is previously performed between the UE and a 3GPP/non-3GPP network side. Consequently, a relatively long authentication time is consumed, and user experience is relatively poor.

SUMMARY

Embodiments of the present invention disclose a method and a system for performing network access authentication based on a non-3GPP network, and a related device, so that security context information stored after UE successfully accesses a network last time can be used to complete current non-3GPP-based network access authentication, steps in a non-3GPP-based network access authentication procedure in the prior art can be reduced, and the UE can quickly access the network.

According to a first aspect, an embodiment of the present invention provides a method for performing network access authentication based on a non-3GPP network, including:

obtaining, by a user equipment (UE), retained information that is of the UE and that exists after the UE successfully accesses a network last time;

determining access and mobility management function network element (AMF) indication information and a first security key based on the retained information of the UE;

generating first authentication code based on the first security key;

sending a first request message to a non-3GPP interworking function network element (N3IWF), where the first request message carries the first authentication code, the AMF indication information, and key identifier information, the first authentication code is used by the N3IWF to perform security authentication on the UE, and the key identifier information is used to obtain the first security key; and receiving a first response message returned by the N3IWF based on the first request message.

In the solutions of this application, the user equipment UE obtains the retained information that is of the UE and that exists after the UE successfully accesses the network last time; determines the access and mobility management function network element AMF indication information and the first security key based on the retained information of the UE; generates the first authentication code based on the first security key; sends the first request message to the non-3GPP interworking function network element N3IWF, where the first request message carries the first authentication code, the AMF indication information, and the key identifier information, the first authentication code is used by the N3IWF to perform security authentication on the UE, and the key identifier information is used to obtain the first security key; and receives the first response message returned by the N3IWF based on the first request message. In this way, the UE can complete current non-3GPP-based network access authentication again by using security context information stored in the UE after the UE successfully accesses the network last time, so that steps in a non-3GPP-based network access authentication procedure in the prior art are reduced, and the UE can quickly access the network.

In some optional solutions, the first response message carries second authentication code, the second authentication code is generated by the N3IWF based on the first security key, and the method further includes:

generating second verification code based on the first security key; and if the second verification code matches the second authentication code, determining that security authentication performed by the UE on the N3IWF succeeds.

After performing the foregoing steps, the user equipment completes security authentication on the N3IWF based on integrity verification of the second verification code. To be specific, the UE verifies whether the N3IWF is true. This helps the UE quickly access the network based on non-3GPP.

In some optional solutions, after the determining that security authentication performed by the UE on the N3IWF succeeds, the method further includes:

sending a fourth request message to the N3IWF, where the fourth request message is carried in the Internet protocol security IPsec protocol, the fourth request message carries third authentication code and the key identifier information, and the third authentication code is used by a first AMF indicated by the AMF indication information to perform security authentication on the UE; and receiving a fourth response message sent by the N3IWF, where the fourth response message is carried in the Internet protocol security IPsec protocol, and the fourth response message is used to indicate that registration of the UE succeeds.

After performing the foregoing steps, the user equipment adds the fourth request message into the IPsec protocol and sends the fourth request message to the N3IWF, so that the first AMF on a network side can perform security authentication on the UE.

In some optional solutions, the first request message further carries third authentication code, and the third authentication code is used by a first AMF to perform security authentication on the UE.

In some possible solutions, the method further includes:

determining a NAS integrity key based on the retained information of the UE; and generating third authentication code based on the NAS integrity key, where the key identifier information is further used to obtain the NAS integrity key.

After performing the foregoing steps, the user equipment obtains the NAS integrity key from the retained information of the UE, and then generates the third authentication code by using the NAS integrity key, so that the first AMF obtains the NAS integrity key based on the key identifier information, and completes security authentication on the UE based on verification of the third authentication code. In this way, the UE can quickly and securely access the network.

According to a second aspect, an embodiment of the present invention provides a method for performing network access authentication based on a non-3GPP network, including:

receiving, by an N3IWF, a first request message sent by UE, where the first request message carries first authentication code, AMF indication information, and key identifier information;

sending the key identifier information to a first AMF indicated by the AMF indication information, and receiving the first security key corresponding to the key identifier information;

generating first verification code based on the first security key; and if the first authentication code matches the first verification code, sending a first response message to the UE.

In the solutions of this application, the N3IWF receives the first request message sent by the UE, where the first request message carries the first authentication code, the AMF indication information, and the key identifier information; sends the key identifier information to the first AMF indicated by the AMF indication information, and receives the first security key corresponding to the key identifier information; generates the first verification code based on the first security key; and if the first authentication code matches the first verification code, sends the first response message to the UE. In this way, the N3IWF can perform security authentication on the UE based on integrity verification of the first authentication code, so that steps in a non-3GPP-based network access authentication procedure in the prior art can be reduced, and the UE can quickly access a network.

In some possible solutions, the method further includes:

generating second authentication code based on the first security key; and sending the second authentication code to the UE, where the second authentication code is used by the UE to perform security authentication on the N3IWF.

After performing the foregoing steps, the N3IWF generates the second authentication code by using the received first security key, and sends the second authentication code to the UE, so that the UE can perform security authentication on the N3IWF.

In some optional solutions, the sending the key identifier information to a first AMF indicated by the AMF indication information specifically includes: searching for the first AMF based on the AMF indication information; and sending a second request message to the first AMF, where the second request message carries the key identifier information; and the receiving the first security key corresponding to the key identifier information specifically includes: receiving the first security key sent by the first AMF.

After performing the foregoing steps, the N3IWF directly sends the second request message to the first AMF indicated by the AMF indication information, to obtain the first security key, complete verification of the first authentication code, and generate second authentication code, so that mutual authentication can be performed between the UE and the N3IWF.

In some optional solutions, the sending the key identifier information to a first AMF indicated by the AMF indication information specifically includes:

when the first AMF indicated by the AMF indication information is not found, sending a third request message to a second AMF, so that the second AMF sends a second request message to the first AMF, where the second request message and the third request message each carry the key identifier information, and the second request message is used to obtain the first security key for verifying the first authentication code; and the receiving the first security key corresponding to the key identifier information specifically includes:

receiving the first security key sent by the second AMF, where the first security key is determined by the first AMF based on the key identifier information, or the first security key is generated by the second AMF based on received information that is about the first security key and that is sent by the first AMF, and the information about the first security key includes a derivation parameter used to derive the first security key.

After the foregoing steps are performed, when the N3IWF cannot find the first AMF indicated by the AMF indication information, the N3IWF sends the third request message to the second AMF, so that the second AMF sends the second request message to the first AMF. In this way, the N3IWF obtains the first security key, completes verification of the first authentication code, and generates second authentication code, so that mutual authentication can be finally performed between the UE and the N3IWF.

In some optional solutions, the sending the key identifier information to a first AMF indicated by the AMF indication information specifically includes:

when the first AMF indicated by the AMF indication information is not found, sending a third request message to a second AMF, so that the second AMF sends a second request message to the first AMF, where the second request message and the third request message each carry the key identifier information, and the second request message is used to obtain the first security key for verifying the first authentication code;

receiving redirection instruction information sent by the first AMF by using the second AMF, where the redirection instruction information carries address information of the first AMF, and the redirection instruction information is used to instruct the N3IWF to resend a second request message to the first AMF; and sending, based on the redirection instruction information, the second request message to the first AMF corresponding to the address information; and the receiving the first security key corresponding to the key identifier information specifically includes:

receiving the first security key sent by the first AMF.

After the foregoing steps are performed, when the N3IWF cannot find the first AMF indicated by the AMF indication information, the N3IWF sends the third request message to the second AMF, so that the second AMF sends the second request message to the first AMF. After receiving the second request message, the first AMF sends the redirection instruction information to the first AMF by using the second AMF. In this way, the N3IWF directly establishes a communication connection to the first AMF, and obtains the first security key from the first AMF, so that mutual authentication can be performed between the UE and the N3IWF.

In some optional solutions, after the sending a first response message to the UE, the method further includes:

receiving a fourth request message sent by the UE, where the fourth request message is carried in the Internet protocol security IPsec protocol, the fourth request message carries third authentication code and the key identifier information, and the third authentication code is used by the first AMF to perform security authentication on the UE;

sending the fourth request message to the first AMF, and receiving a fourth response message returned by the first AMF based on the fourth request message, where the fourth request message and the fourth response message are carried in the NG2 protocol; and sending the fourth response message to the UE, where the fourth request message is carried in the Internet protocol security IPsec protocol, and the fourth response message is used to indicate that registration of the UE succeeds.

After performing the foregoing steps, the N3IWF receives the fourth request message that is added by the UE into the IPsec protocol, extracts the fourth request message from the IPsec protocol, and then adds the fourth request message into the NG2 protocol to send the fourth request message to the first AMF, so that security authentication performed by the first AMF on the UE can be completed. Similarly, when the first AMF sends the fourth response message to the UE, similarly, the first AMF needs to first add the fourth response message into the IPsec protocol and send the fourth response message to the N3IWF, and then add the fourth response message into the NG2 protocol to finally send the fourth response message to the UE, so that the first AMF can perform security authentication on the UE.

In some optional solutions, the first request message carries third authentication code, the third authentication code is used by the first AMF to perform security authentication on the UE, and the method further includes: sending, by the N3IWF, the third authentication code to the first AMF.

According to a third aspect, an embodiment of the present invention provides a method for performing network access authentication based on a non-3GPP network, including:

receiving, by a first AMF, a second request message sent by an N3IWF, where the second request message carries key identifier information;

determining a first security key based on the key identifier information; and sending a second response message to the N3IWF, where the second response message carries the first security key.

In the solutions of this application, the first AMF receives the second request message sent by the N3IWF, where the second request message carries the key identifier information; next, determines the first security key based on the key identifier information; and finally, sends the second response message to the N3IWF, where the second response message carries the first security key. In this way, the first AMF determines the first security key based on the key identifier information sent by the N3IWF, and sends the first security key to the N3IWF, to help the N3IWF complete security authentication on the UE, so that the UE can quickly access a network.

In some optional solutions, the receiving, by a first AMF, a second request message sent by an N3IWF specifically includes:

receiving a second request message sent by a second AMF, where the second request message is sent by the second AMF based on a received third request message sent by the N3IWF; and the sending a second response message to the N3IWF specifically includes:

sending a third response message to the second AMF, so that the second AMF sends a second response message to the N3IWF, where the second response message and the third response message each carry the first security key.

After the foregoing steps are performed, when the N3IWF cannot find the first AMF corresponding to the AMF indication information, the first AMF receives the second request message that is sent by the second AMF and that is used to obtain the first security key. After determining the first security key, similarly, the first AMF sends the found first security key to the N3IWF by using the second AMF, to help the N3IWF complete security authentication on the UE, so that the UE can quickly access a network.

In some optional solutions, the receiving, by a first AMF, a second request message sent by an N3IWF specifically includes:

receiving a second request message sent by a second AMF, where the second request message is sent by the second AMF based on a received third request message sent by the N3IWF; and before the sending a second response message to the N3IWF, the method further includes:

sending redirection instruction information to the N3IWF by using the second AMF, where the redirection instruction information is used to instruct the N3IWF to send the second request message to the first AMF; and receiving the second request message sent by the N3IWF based on the redirection instruction information.

After the foregoing steps are performed, when the N3IWF cannot find the first AMF corresponding to the AMF indication information, and the first AMF receives the second request message that is sent by the second AMF and that is used to obtain the first security key, the first AMF may send the redirection instruction information to the first AMF by using the second AMF, to establish a direct communication connection between the first AMF and the N3IWF, thereby avoiding the following case: When a message is transmitted between the first AMF and the N3IWF again, the message needs to be forwarded by the second AMF. Therefore, a network access time of the UE is reduced, and the UE can quickly access a network.

In some optional solutions, after the sending a second response message to the N3IWF, the method further includes:

receiving a fourth request message sent by the N3IWF, where the fourth request message carries third authentication code and the key identifier information, and the third authentication code is used by the first AMF to perform security authentication on the UE;

determining a NAS integrity key based on the key identifier information;

generating third verification code based on the NAS integrity key; and if the third verification code matches the third authentication code, sending a fourth response message to the N3IWF, where the fourth response message is used to indicate that registration of the UE succeeds.

After performing the foregoing steps, the first AMF receives the fourth request message sent by the UE by using the N3IWF, where the fourth request message carries the third authentication code, so that the first AMF can perform security authentication on the UE based on verification of the third authentication code, and the UE can securely and quickly access a network.

In some optional solutions, the second request message further carries third authentication code, and before the determining a first security key based on the key identifier information, the method further includes:

determining a NAS integrity key based on the key identifier information;

generating third verification code based on the NAS integrity key; and if the third verification code matches the third authentication code, performing the step of determining a first security key based on the key identifier information.

After the foregoing steps are performed, if the second request message received by the first AMF carries the third authentication code, the first AMF verifies the third authentication code, to perform security authentication on the UE, so that steps in a network access authentication procedure are reduced, and the UE can securely and quickly access a network.

According to a fourth aspect, an embodiment of the present invention provides a method for performing network access authentication based on a non-3GPP network, including:

receiving, by a first AMF, a second request message sent by a second AMF, where the second request message carries key identifier information;

determining, based on the key identifier information, a derivation parameter used to derive a first security key; and sending a third response message to the second AMF, where the third response message carries the derivation parameter used to derive the first security key, so that the second AMF generates the first security key based on the received derivation parameter.

In the solutions of this application, the first AMF receives the second request message sent by the second AMF, where the second request message carries the key identifier information; determines, based on the key identifier information, the derivation parameter used to derive the first security key; and sends the third response message to the second AMF, where the third response message carries the derivation parameter used to derive the first security key, so that the second AMF generates the first security key based on the derivation parameter. This helps the UE and an N3IWF complete mutual security authentication, so that the UE can securely and quickly access a network.

According to a fifth aspect, an embodiment of the present invention provides a method for performing network access authentication based on a non-3GPP network, including:

receiving, by a second AMF, a third request message sent by an N3IWF, where the third message carries a UE temporary identifier and key identifier information, and the key identifier information is used to obtain a first security key;

sending a second request message to a first AMF corresponding to the UE temporary identifier, where the second request message carries the UE temporary identifier and the key identifier information;

receiving a third response message sent by the first AMF, where the third response message carries a derivation parameter used to derive the first security key;

generating the first security key based on the derivation parameter; and sending a second response message to the N3IWF, where the second response message carries the first security key, and the first security key is used by the N3IWF to perform security authentication on the UE.

In the solutions of this application, after receiving the third request message sent by the N3IWF, the second AMF sends the second request message to the first AMF corresponding to the UE temporary identifier, where the second request message and the third request message carry the UE temporary identifier and the key identifier information; receives the third response message sent by the first AMF, where the third response message carries the derivation parameter used to derive the first security key; generates the first security key based on the derivation parameter; and sends the second response message to the N3IWF, where the second response message carries the first security key, and the first security key is used by the N3IWF to perform security authentication on the UE. In this way, the second AMF generates the first security key based on the derivation parameter. This helps the UE and the N3IWF complete mutual security authentication, so that the UE can securely and quickly access a network.

In some optional solutions, the second request message and the third request message each further carry third authentication code, and the third authentication code is used by the first AMF to perform security authentication on the UE.

With reference to the embodiment in any one of the first aspect to the fifth aspect, in some optional solutions, the first security key is a NAS integrity key in security context information of the UE.

With reference to the embodiment in any one of the first aspect to the fifth aspect, in some optional solutions, the first security key is a key derived based on a security key in the security context information of the UE and a first fresh protection parameter.

With reference to the embodiment in any one of the first aspect to the fifth aspect, in some optional solutions, the security key includes a key Kseaf or a key Kamf, and the first fresh protection parameter includes any one of the following: a count value of a counter, a first random number, and the UE temporary identifier.

With reference to the embodiment in any one of the first aspect to the fifth aspect, in some optional solutions, the AMF indication information is used to indicate the first AMF that performs mutual security authentication with the UE, and the AMF indication information includes the UE temporary identifier or network access identifier NAI information generated based on the UE temporary identifier.

With reference to the embodiment in any one of the first aspect to the fifth aspect, in some optional solutions, the key identifier information includes the UE temporary identifier and/or a key identifier in the security context information of the UE.

With reference to the embodiment in any one of the first aspect to the fifth aspect, in some optional solutions, the third authentication code is generated based on the NAS integrity key (namely, the NAS integrity key) in the security context information of the UE and a second fresh protection parameter.

With reference to the embodiment in any one of the first aspect to the fifth aspect, in some optional solutions, the second fresh protection parameter includes any one of the following: the count value of the counter and a second random number.

According to a sixth aspect, the present invention provides user equipment, where the user equipment includes a function unit configured to perform the method in the first aspect.

According to a seventh aspect, the present invention provides a non-3GPP interworking function network element, where the non-3GPP interworking function network element includes a function unit configured to perform the method in the second aspect.

According to an eighth aspect, the present invention provides an access and mobility management function network element, where the access and mobility management function network element includes a function unit configured to perform the method in any one of the third aspect to the fifth aspect.

According to a ninth aspect, the present invention provides user equipment, including a processor, a memory, and a transceiver, where the memory is configured to store program code used to perform network access authentication based on a non-3GPP network, and the processor is configured to invoke the program code used to perform network access authentication based on a non-3GPP network, to perform the method described in the first aspect.

According to a tenth aspect, the present invention provides a non-3GPP interworking function network element, including a processor, a memory, and a transceiver, where the memory is configured to store program code used to perform network access authentication based on a non-3GPP network, and the processor is configured to invoke the program code used to perform network access authentication based on a non-3GPP network, to perform the method described in the second aspect.

According to an eleventh aspect, the present invention provides an access and mobility management function network element, including a processor, a memory, and a transceiver, where the memory is configured to store program code used to perform network access authentication based on a non-3GPP network, and the processor is configured to invoke the program code used to perform network access authentication based on a non-3GPP network, to perform the method described in the third aspect, the fourth aspect, or the fifth aspect.

According to a twelfth aspect, a computer readable storage medium is provided, where the computer readable storage medium stores program code used to perform network access authentication based on a non-3GPP network, and the program code includes an instruction used to perform the method described in the first aspect.

According to a thirteenth aspect, a computer readable storage medium is provided, where the computer readable storage medium stores program code used to perform network access authentication based on a non-3GPP network, and the program code includes an instruction used to perform the method described in the second aspect.

According to a fourteenth aspect, a computer readable storage medium is provided, where the computer readable storage medium stores program code used to perform network access authentication based on a non-3GPP network, and the program code includes an instruction used to perform the method described in any one of the third aspect to the fifth aspect.

According to a fifteenth aspect, a computer program product is provided, where the computer program product includes a program instruction, and when the computer program product is executed by user equipment, the user equipment performs the method described in the first aspect. The computer program product may be a software package. When the method described in the first aspect needs to be used, the computer program product may be downloaded and executed on the user equipment.

According to a sixteenth aspect, a computer program product is provided, where the computer program product includes a program instruction, and when the computer program product is executed by a non-3GPP interworking function network element N3IWF, the N3IWF performs the method described in the first aspect. The computer program product may be a software package. When the method described in the second aspect needs to be used, the computer program product may be downloaded and executed on the non-3GPP interworking function network element N3IWF.

According to a seventeenth aspect, a computer program product is provided, where the computer program product includes a program instruction, and when the computer program product is executed by an access and mobility management function network element AMF, the AMF performs the method described in any one of the third aspect to the fifth aspect. The computer program product may be a software package. When the method described in any one of the third aspect to the fifth aspect needs to be used, the computer program product may be downloaded and executed on the access and mobility management function network element AMF.

After the embodiments of the present invention are implemented, steps in a prior-art procedure in which the UE currently performs network access authentication based on non-3GPP after the UE successfully accesses a network last time can be reduced, and a network access authentication time can be reduced, so that the UE can quickly access the network.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following describes the technical solutions in the embodiments of the present invention in detail with reference to the accompanying drawings in the present invention.

Figure 1:
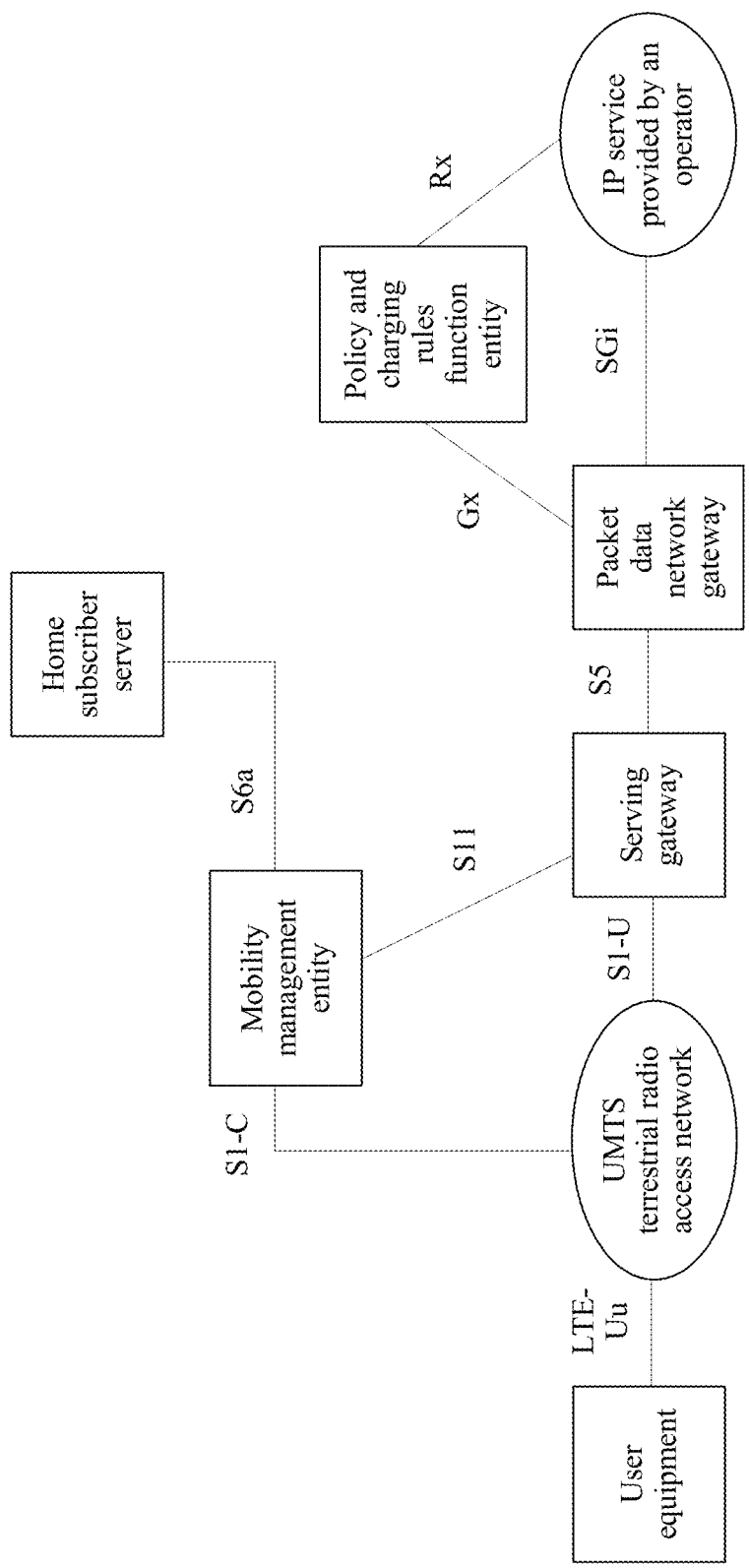
FIG. 1 is a schematic diagram of a 3GPP network framework in LTE according to an embodiment of the present invention.

FIG. 1 is a schematic diagram of a 3GPP network framework in LTE according to an embodiment of the present invention. The schematic diagram of the network framework includes user equipment (UE), a UMTS terrestrial radio access network (E-UTRAN), a mobility management entity (MME), a home subscriber server (HSS), a serving gateway (SGW), a packet data network gateway (PDN-GW), a policy and charging rules function (PCRF) entity, and an IP service provided by an operator, where the IP service provided by the operator is shown as "operator's IP service" in the figure.

It should be understood that, the E-UTRAN is an air interface access part in LTE, is also usually referred to as an evolved NodeB (eNodeB), and provides a radio resource for access of the user equipment UE. The mobility management entity MME is located in a core network, is responsible for security, mobility management, and session management, and includes functions such as bearer control in the core network, serving gateway SGW and packet data network gateway PDN-GW selection, and authentication. The SGW is responsible for user-plane data transmission and forwarding, route switching, and the like of the UE. The packet data network gateway PDN-GW is mainly responsible for connecting to a PDN network, allocating an IP address to a user, and the like. The home subscriber server HSS is responsible for storing subscription information, authentication data, and the like of the user. The policy and charging rules function PCRF entity is responsible for generating, based on information such as subscription information of the user, an Internet protocol capability access network (IP Capability Access Network, IP-CAN) type, and an IP-CAN capability, policy and charging rules information used to establish a bearer.

Based on the schematic diagram of the 3GPP network framework shown in FIG. 1, the UE is connected to a network based on 3GPP, and a network access authentication procedure of the UE is as follows: UE→E-UTRAN→MME→HSS. The UE sends an attach request to the MME, and the MME requests an authentication vector set of the user from the HSS. Then, LTE-based authentication and key agreement EPS-AKA (Evolved packet system-authentication and key agreement) authentication is performed between the UE and the MME. Finally, security authentication between the UE and a 3GPP network side is completed, and the UE can access the 3GPP network.

Figure 2:
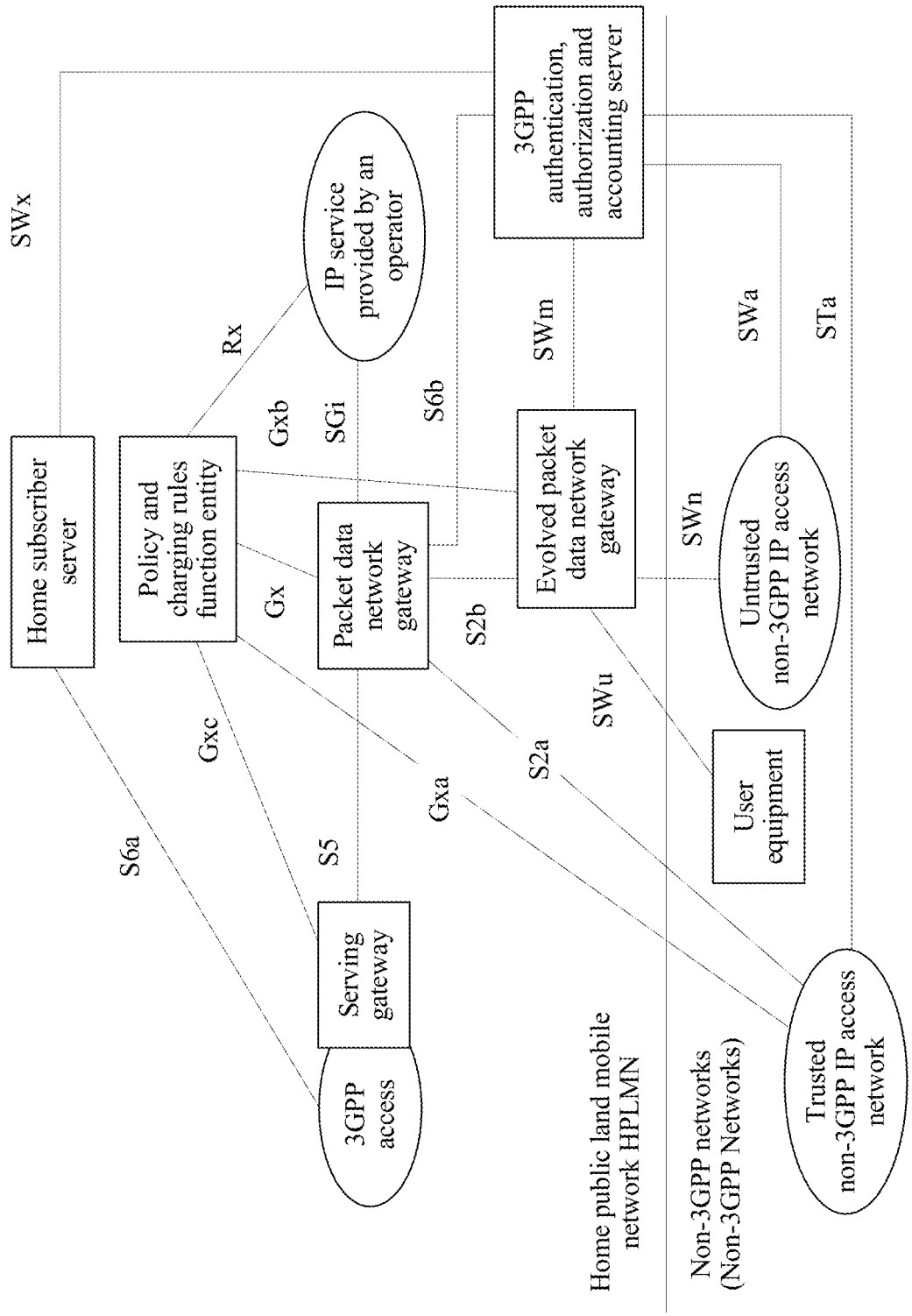
FIG. 2 is a schematic diagram of a non-3GPP network framework in LTE according to an embodiment of the present invention.

FIG. 2 is a schematic diagram of a non-3GPP network framework in LTE according to an embodiment of the present invention. The schematic diagram of the network framework includes user equipment UE, an (un)trusted non-3GPP IP access ((Un)trusted non-3GPP IP Access) network, an evolved packet data network gateway (ePDG), a 3GPP authentication, authorization and accounting (3GPP AAA) server, a home subscriber server (HSS), a serving gateway (SGW), and a packet data network gateway (PDN-GW).

It should be understood that, the evolved packet data network gateway ePDG is an entity having a PDN-GW function defined in 3GPP TS 23.234, and has a function of specifically modifying or expanding the PDN-GW function. The trusted non-3GPP IP access untrusted non-3GPP IP access network such as a wireless local area network WLAN (Wireless Local Area Network, WLAN) provides a radio resource for access of the UE. The 3GPP AAA server is responsible for performing authentication and authorization on the UE. For related descriptions of the home subscriber server HSS, the serving gateway SGW, the packet data network gateway PDN-GW, and a policy and charging rules function PCRF, refer to related descriptions in the embodiment in FIG. 1. Details are not described herein again.

It should be understood that the PDN-GW supports non-3GPP access through an S2a or S2b interface. The S2a interface allows trusted non-access performed based on the proxy mobile IP (PMIP) protocol and the mobile IPv4 (MIPV4) protocol. The S2b interface allows untrusted non-3GPP access performed based on the proxy mobile IPv6 (PMIPv6) protocol.

It should be understood that a non-3GPP network may include a network that does not comply with a specification formulated by 3GPP, for example, Wi-Fi (Wireless Fidelity) or WiMAX (Worldwide Interoperability for Microwave Access).

Similarly, based on the diagram of the non-3GPP network framework shown in FIG. 2, when the UE accesses a network based on non-3GPP, a network access authentication procedure is as follows: UE→ePDG→3GPP AAA server→HSS. The UE establishes a secure tunnel with the ePDG The ePDG actively initiates extensible authentication protocol (Extensible Authentication Protocol, EAP) authentication. The 3GPP AAA server participates in an EAP authentication procedure as an EAP server. After the authentication ends, security authentication between the UE and the 3GPP network side can be completed, and the UE can access the 3GPP network.

It can be learned from the network framework diagrams shown in FIG. 1 and FIG. 2 that, when the UE accesses the network based on 3GPP in LTE and non-3GPP in LTE, signaling control plane network elements used in the network access authentication procedures of the UE are not totally the same or different, and there is no association between the two network access procedures of the UE. To be specific, the UE cannot prepare for non-3GPP access by using convenience of 3GPP access.

Figure 3:
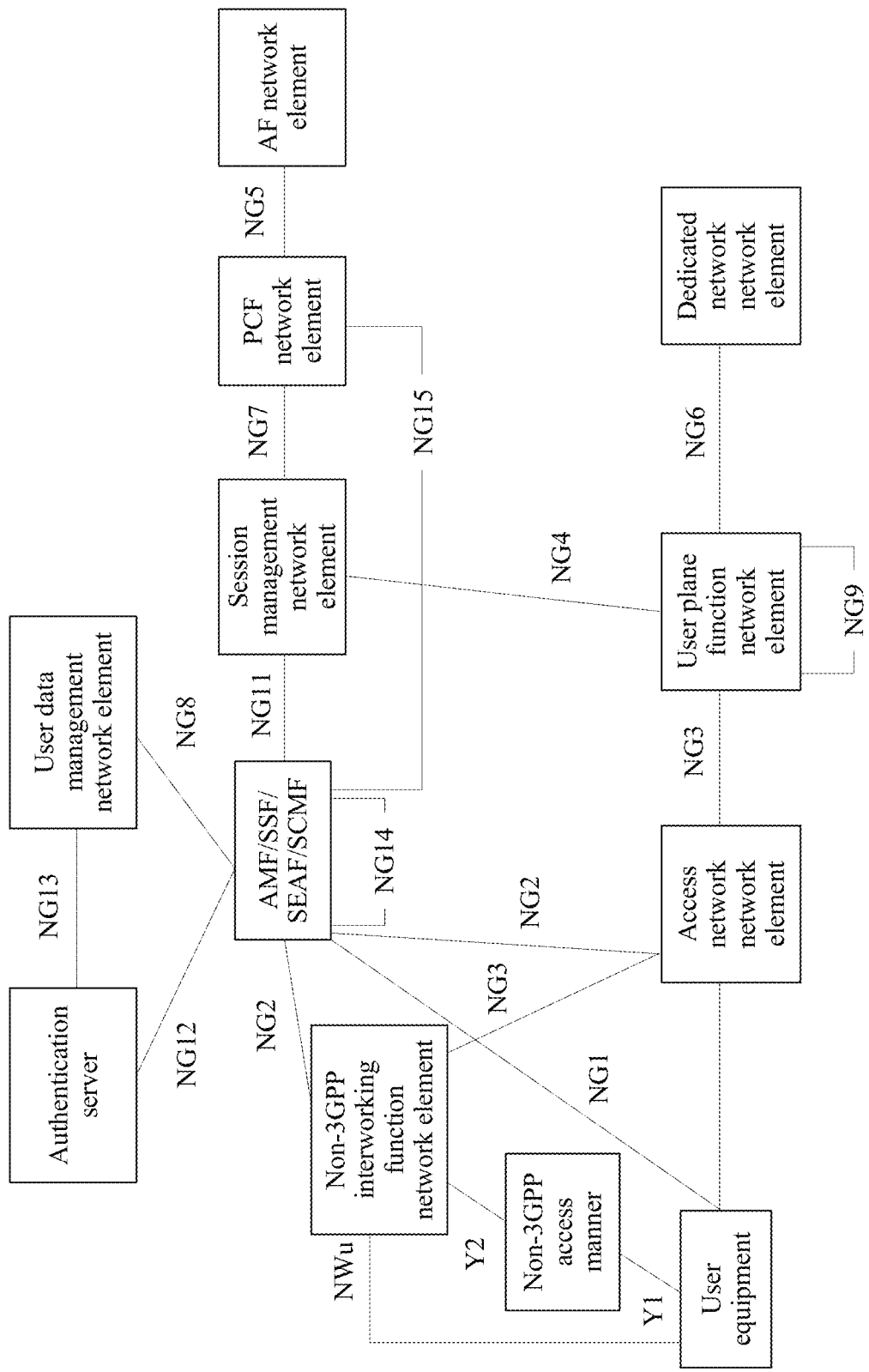
FIG. 3 is a schematic diagram of a 5G network framework according to an embodiment of the present invention.

To resolve the foregoing problem that there is no association between 3GPP-based network access in LTE and non-3GPP-based network access in LTE, FIG. 3 is a schematic diagram of a 5G network framework according to an embodiment of the present invention. The schematic diagram of the network framework includes network elements such as user equipment, an access network network element (Radio Access network, R-AN) that is shown as (R)AN in the figure, a non-3GPP access manner, a non-3GPP interworking function network element (N3IWF), an access and mobility management function network element, a session management function network element (SMF), a user plane function network element (UPF), and a dedicated network network element (DN).

It should be understood that (R)AN is a 3GPP network element such as an eNB in LTE or an NB in UMTS. A non-3GPP access technology is an access technology other than 3GPP, for example, Wi-Fi. The N3IWF is similar to an ePDG in LTE, and is a network element used to establish an IPsec tunnel with the UE when the UE performs access by using the non-3GPP technology in 5G. In a future 5G definition, a name of the N3IWF may be changed.

The access and mobility management function network element AMF is responsible for access management and mobility management of the UE. In actual application, the AMF is equivalent to mobility management MM of a mobility management entity MME in an LTE network framework, and access management is added into the AMF.

It should be understood that, the access and mobility management function network element AMF may be further merged with a security anchor function network element (SEAF) and a security context management function network element (SCMF). To be specific, the AMF also has functions of the SEAF and the SCMF. The security anchor function network element may alternatively be an independent network element that is independent of the access and mobility management function network element AMF. An authentication credentials repository and processing function network element (ARPF) is mainly responsible for storing subscription information of a user, for example, a long-term key. An authentication server (AUSF) interacts with the ARPF, and terminates an authentication request from the SEAF. The AUSF and the ARPF may be understood as function network elements obtained by dividing an HSS in the LTE network framework. The SEAF and the AUSF interact with the UE, receive an intermediate key in a network access authentication procedure, and may be understood as function network elements obtained by dividing the MME in the LTE network framework. The SCMF obtains the intermediate key from the SEAF, and further derives a key of the intermediate key. Optionally, the ARPF is merged with a user data management network element (UDM) in the figure as a part of the UDM. Optionally, the SEAF and the SCMF may alternatively be separated from the AMF and used as an independent authentication function network element (AUF).

The session management function network element SMF is responsible for session management such as session establishment of the user, and is equivalent to a session management function of the mobility management network element MME. The user plane function network element UPF is a user plane function network element of the UE, is mainly responsible for connecting to an external network, and is equivalent to a combination of a serving gateway SGW and a PDN gateway (PDN-GW) in LTE. The dedicated network network element DN is a network responsible for providing a service for the UE, for example, some DNs provide a network access function for the UE, and some other DNs provide an SMS function for the UE. It should be noted that because some function network elements/entities shown in the figure are not related to the solutions of this application, details are not described herein.

Based on the schematic diagram of the 5G network architecture shown in FIG. 3, a non-3GPP-based network access authentication procedure in 5G is as follows: UE→non-3GPP→N3IWF→AMF, and a 3GPP-based network access authentication procedure in 5G is as follows: UE→(R)AN→AMF. It can be learned that, the AMF serves as an aggregation function entity (aggregation network element) of 3GPP and non-3GPP on a signaling control plane in 5G, thereby resolving a problem that there is no association between 3GPP-based network access and non-3GPP-based network access in LTE. However, in actual application, it is found that, when the UE accesses a network again based on 3GPP or non-3GPP after the UE successfully accesses the network last time based on 3GPP or non-3GPP, the UE still needs to complete mutual authentication between the UE and the network side again based on the 3GPP-based or non-3GPP-based network access authentication procedure, and can successfully access the network only after the authentication succeeds. Because the 3GPP-based or non-3GPP-based network access authentication procedure is relatively complex, a relatively long authentication time is consumed, and the UE cannot successfully access the network in a timely manner. Consequently, user experience is affected.

Figure 4A:
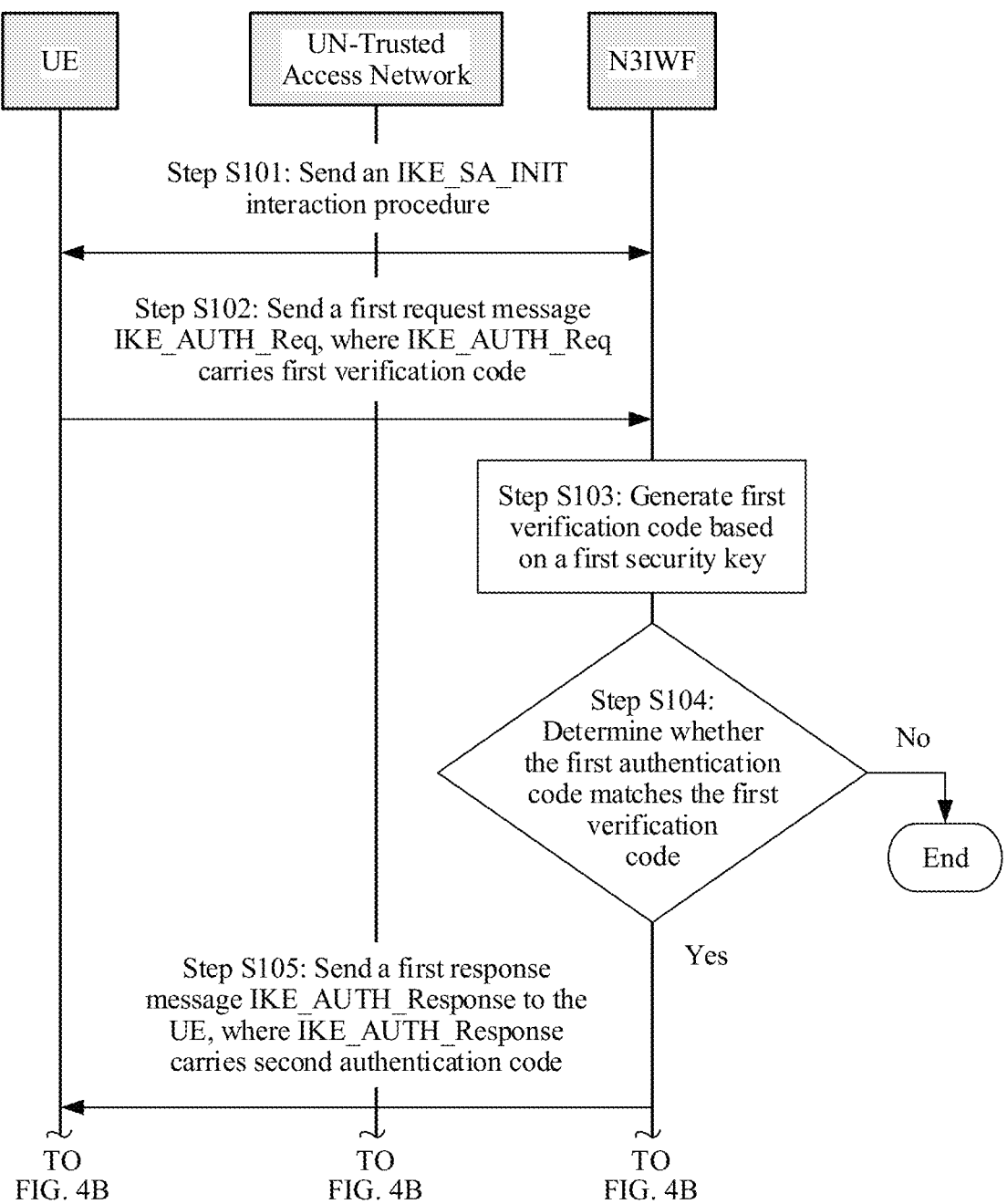
FIG. 4A to FIG. 9 are schematic flowcharts of several methods for performing network access authentication based on a non-3GPP network according to an embodiment of the present invention.
Figure 4B:
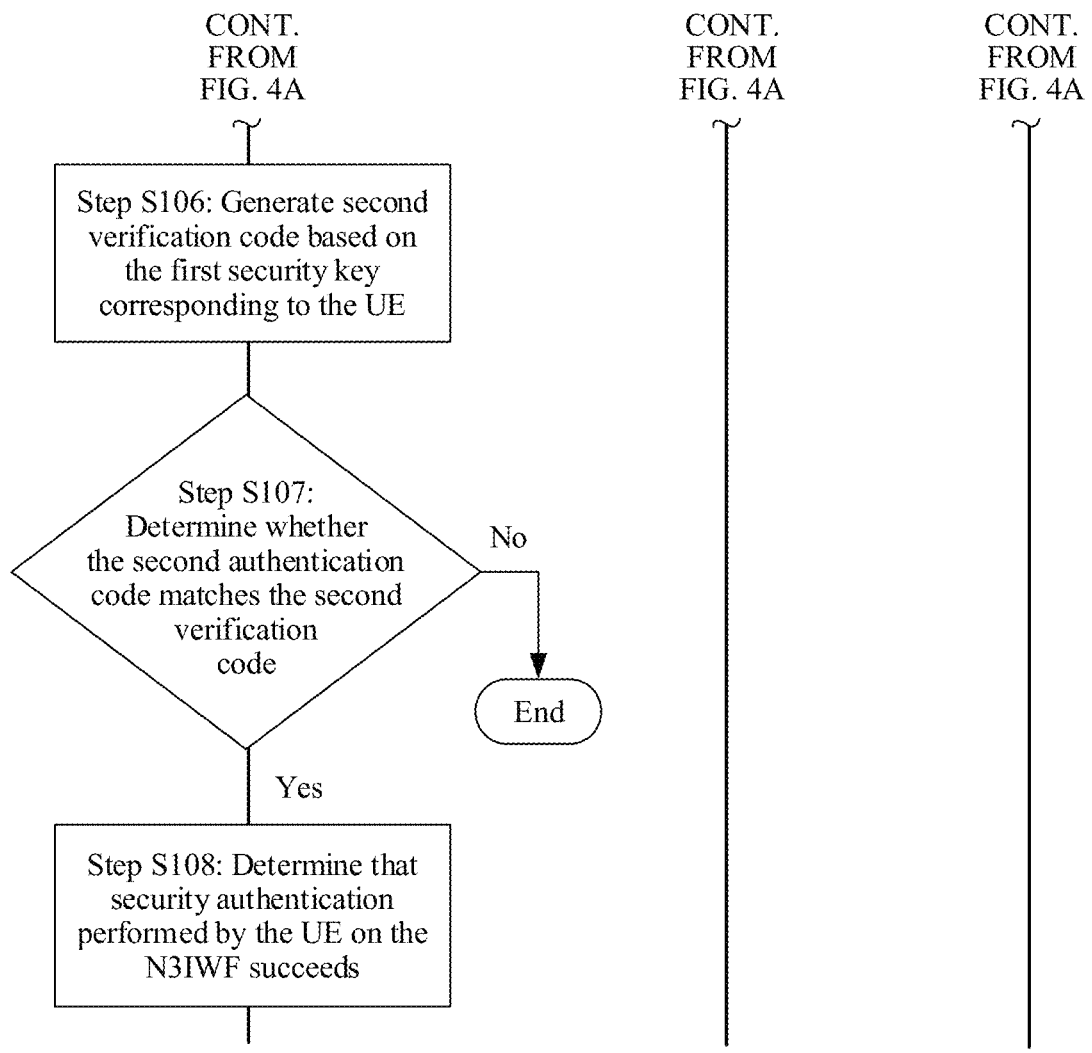

To resolve the foregoing problem that a relatively long network access authentication time is consumed when the UE accesses the network again based on non-3GPP after the UE successfully accesses the network last time based on 3GPP or non-3GPP, with reference to the schematic diagram of the 5G network framework shown in FIG. 3, FIG. 4A and FIG. 4B are a schematic flowchart of a method for performing network access authentication based on a non-3GPP network according to an embodiment of the present invention. The method includes the following implementation steps.

Step S101: UE sends an IKE_SA_INIT request message to an N3IWF. Correspondingly, the N3IWF receives an IKE_SA_INIT response message returned by the UE based on the IKE_SA_INIT request message.

In the solutions of this application, after the UE successfully accesses a network last time based on either 3GPP (for example, 2G/3G/4G/5G) or non-3GPP (for example, Wi-Fi), a network side allocates a corresponding UE temporary identifier to the UE, and the UE further generates corresponding security context information or other information. To be specific, after the UE successfully accesses the network last time, the UE stores retained information that exists after the UE successfully accesses the network last time. The retained information may include the UE temporary identifier, the security context information, or some other information generated by the UE or the network side.

It should be understood that the UE temporary identifier is an identity allocated by a core network to the UE when the UE accesses the network. The UE temporary identifier may be used by a RAN or the N3IWF to search for corresponding AMF information, for example, a GUTI (Globally Unique Temporary UE Identity,) in LTE. The security context information may include a key generated in an authentication procedure, and a non-access stratum (NAS) key, a radio resource control (RRC) key, and a user plane protection key that are still used subsequently, for example, Kamf, Knas-int, Knas-enc, Krrc-int, Krrc-enc, Kup-int, and Kup-enc, or an anchor key Kseaf, an AMF key Kamf, and an encryption/decryption key and an integrity protection key that are used to protect a NAS layer, an AS layer, and a user plane in 5G. Optionally, the security context information may further include an encryption algorithm, an integrity protection algorithm, another key and another algorithm that are generated by the UE through negotiation with the network side last time, or the like. This is not limited in this embodiment of the present invention.

It should be noted that the security context information is continuously expanded as a new key is generated. Key identifier information may be allocated by the network side, or may be represented/identified by the UE temporary identifier. If the key identifier information is the UE temporary identifier, a process of obtaining a key by using the key identifier information is as follows: The UE and the network side find the security context information by using the UE temporary identifier, and obtain the key from a security context. If the key identifier information identifies all keys or a key derived from a key identified by the key identifier information, the key identifier information may alternatively identify all newly derived keys. For example, in LTE, KSIasme identifies Kasme and a key related to Kasme. For another example, in 5G; KSIseaf, KSIamf, or KSIseaf+KSIAIamf may be used for identification.

When the UE accesses the network again based on non-3GPP (for example, Wi-Fi) after the UE successfully accesses the network last time, the UE exchanges an IKE_SA_INIT message (Internet key exchange initial association,) with the N3IWF. To be specific, the UE sends the IKE_SA_INIT request message (IKE_SA_INIT1 message) to the N3IWF. The IKE_SA_INIT request message carries a parameter KEi of a secure channel that can be established by the UE and a random number Randi (Random number) generated by the initiator UE. KEi herein may be a parameter of one or more secure channels that can be established by the UE.

Correspondingly, the N3IWF receives the IKE_SA_INIT request message (assuming that the message is denoted as an IKE_SA_INIT1 message) sent by the UE, and obtains corresponding parameter information by parsing the IKE_SA_INIT1 message, for example, KEi and Randi. The N3IWF selects, from KEi, a parameter KEr of the security channel that the UE and the network side negotiate to establish, and further generates Randr. Further, the N3IWF sends the IKE_SA_INIT response message (IKE_SA_INIT2 message) to the UE. The IKE_SA_INIT response message carries the parameter KEr of the secure channel that needs to be established between the UE and the network side, and the random number Randr generated by the responder N3IWF.

It should be understood that, the IKE_SA_INIT request message may further carry the UE temporary identifier or other parameter information, and the IKE_SA_INIT response message may further carry identifier information (for example, an ID of the N3IWF or an IP address of the N3IWF) of the N3IWF, other parameter information, or the like. This is not limited in this embodiment of the present invention.

In actual application, parameter information such as KEi, Randi, and the UE temporary identifier carried in the IKE_SA_INIT request message may be placed in a V payload or an N payload of the message, namely, a vendor (vendor) payload or a notification (notification) payload. Similarly, parameter information such as KEr and Randr carried in the IKE_SA_INIT response message may also be placed in a V payload or an N payload of the message for transmission, namely, a vendor (vendor) payload or a notification (notification) payload.

Step S102: The UE sends a first request message to the N3IWF, where the first request message carries first authentication code, AMF indication information, and the key identifier information, the first authentication code is used by the N3IWF to perform security authentication on the UE, and the key identifier information is used by the N3IWF to obtain a first security key for verifying the first authentication code. Correspondingly, the N3IWF receives the first request message sent by the UE.

In an embodiment of the present invention, before the UE sends the first request message to the N3IWF, the method further includes: the UE generates the first authentication code based on the first security key corresponding to the UE.

In a first implementation, the UE generates the first authentication code AUTH1 by using the first security key Ks in the security context information stored in the UE. The first security key Ks herein may be a security key such as a key Kseaf, a key Kamf, a NAS layer protection key, a user plane integrity protection key (namely, a NAS integrity protection key, also referred to as a NAS integrity key), or another key in the security context information stored in the UE after the UE successfully accesses the network last time. For example, AUTH1=prf (prf (Ks, "Key Pad for IKEv2"), <InitiatorSignedOctets>), where prf is a used algorithm such as hash 256; "Key Pad for IKEv2" is a padding parameter used as an Internet key exchange IKEv2 protocol key, is usually represented by a string, and is used herein as an input parameter for generating the first authentication code; and <InitiatorSignedOctets> is calculated based on some parameter information (for example, KEi) in the IKE_SA_INIT1 message and derivation parameters of the some parameter information. Because calculation of <InitiatorSignedOctets> is described in the prior art, related details are not described herein.

In a second implementation, the UE generates, by using a security key in the security context information stored in the UE and a first fresh protection parameter, the first security key Ks corresponding to the UE. Further, the UE generates the first authentication code AUTH1 based on the first security key.

It should be understood that the security key herein may be a key Kseaf, a key Kamf, or other key information in the security context information corresponding to the UE. The first fresh protection parameter herein may be any one of the following: a count value (NAS uplink count) of a counter, a first random number, the UE temporary identifier, the identifier information of the N3IWF, or another fresh protection parameter. The identifier information of the N3IWF is information used to identify an identity of the N3IWF, for example, an IP address of the N3IWF and an ID of the N3IWF.

For example, the first security key Ks=KDF (Kamf, N3IWF ID) or Ks=KDF (Kseaf, N3IWF ID), and AUTH1=prf (prf (Ks, "Key Pad for IKEv2"), <InitiatorSignedOctets>). KDF is a used algorithm such as hash 256. For descriptions of other parameter information used to generate the first security key Ks and other parameter information used to the first authentication code AUTH1, refer to related detailed descriptions in the foregoing first implementation. Details are not described herein again.

For another example, the first security key Ks=KDF (Kamf, NAS uplink Count) or Ks=KDF (Kseaf, NAS uplink Count), and AUTH1=prf (prf (Ks, "Key Pad for IKEv2"), <InitiatorSignedOctets>). NAS uplink count indicates current data that is collected and recorded by the counter. For descriptions of other parameter information used to generate the first security key Ks and other parameter information used to the first authentication code AUTH1, refer to related detailed descriptions in the foregoing first implementation. Details are not described herein again.

It should be understood that, the first security key Ks herein may be generated by using the security key in the security context information, the first fresh protection parameter, or optionally other parameter information (for example, registration type indication information or an integrity protection algorithm). This is not limited in this embodiment of the present invention.

It should be understood that the key identifier information may include any one or more of the following: a key identifier, a key ID, the UE temporary identifier, or other identifier information used to identify a key identity or the security context information of the UE.

In the solutions of this application, the UE sends the first request message IKE_AUTH_Req (Internet key exchange authentication request, also known as Internet key exchange authentication request) to the N3IWF. The IKE_AUTH_Req message carries the first authentication code AUTH1, the AMF indication information, and the key identifier information. The first authentication code is used by the N3IWF to perform security authentication on the UE.

Correspondingly, the N3IWF receives the first request message IKE_AUTH_Req sent by the UE, and parses the IKE_AUTH_Req message to obtain parameter information such as the first authentication code AUTH1, the key identifier information (for example, the UE temporary identifier and/or the key identifier), and the AMF indication information carried in the IKE_AUTH_Req message. Then, the N3IWF determines whether IKE_AUTH_Req includes the first authentication code AUTH1. When the N3IWF determines that the N3IWF message carries the first authentication code AUTH1, the N3IWF determines not to initiate an extensible authentication protocol (Extensible Authentication Protocol, EAP) authentication request. In addition, because the N3IWF does not store the first security key Ks used to verify the first authentication code AUTH1, the N3IWF needs to wait for the key. In this case, the N3IWF may use the AMF indication information (for example, the UE temporary identifier or NAI information) carried in the IKE_AUTH_Req message and the key identifier information, to obtain, from a first AMF indicated by the AMF indication information, the first security key Ks used to verify the first authentication code AUTH1, and continue to perform step S103.

When the N3IWF determines that the N3IWF message does not carry the first authentication code AUTH1, the N3IWF initiates an EAP authentication procedure. Because the EAP authentication procedure is described in the prior art, details are not described in this embodiment of the present invention.

In actual application, the AMF indication information is used to identify an AMF accessed by the UE when the UE accesses the network last time, and other devices (for example, an eNB, an NR, an ePDG and the N3IWF) in the network may find the AMF by using the AMF indication information. The AMF indication information herein may include the UE temporary identifier corresponding to the UE, or may include the network access identifier (Network Access Identifier, NAI) information generated based on the UE temporary identifier, or AMF identifier information received when the UE performs registration last time, or AMF identifier information obtained by the UE by using another method. The NAI information is generated by using an AMF information part in the UE temporary identifier and 3GPP network identifier information according to an NAI format defined in the standard.

It should be understood that the NAI information may include a user temporary identifier and a 3GPP network address, or AMF identifier information and a 3GPP network address, or other AMF identity information used to identify that the UE performs mutual authentication with the network-side core network element AMF after the UE successfully accesses the network last time.

It should be understood that the AMF indication information and the key identifier information may be same information. One piece of information may be both the AMF indication information and the key identifier information. For example, when the AMF indication information and the key identifier information each are the UE temporary identifier, the UE temporary information carried in the first request message is used to search for and determine the first AMF corresponding to the UE temporary identifier, and may also be used to search for the security context information (namely, a related key in the security context information) of the UE.

It should be understood that the first request message IKE_AUTH_Req may further carry the NAI information, the count value NAS uplink count of the counter, the first fresh protection parameter, or other parameter information that is used by the UE to perform network access authentication. If a service request procedure or a registration cycle procedure is performed, IKE_AUTH_Req carries NAI information in a corresponding procedure, a count value NAS uplink count of a counter in a corresponding procedure, or another parameter used in a corresponding procedure.

In actual application, in the first request message IKE_AUTH_Req, the first authentication code AUTH1 may be placed in an authentication (authentication) payload of the message, any piece of parameter information that is in the UE temporary identifier, the AMF indication information, and the NAI information and that is used to identify an identity is placed in an IDi (Identity initial,) payload of the message, and parameter information such as the key identifier information (for example, the key identifier) is placed in a V payload of the message. Optionally, parameter information such as the UE temporary identifier and the key identifier information may be placed in a V payload or an N payload of the message.

Alternatively, in the first request message IKE_AUTH_Req, the first authentication code AUTH1 may be placed in an authentication payload part of the message, and the UE temporary identifier, the key identifier information, or other parameter information is placed in another part of the message, for example, a V payload or an N payload. This is not limited in this embodiment of the present invention.

In addition, in the first request message IKE_AUTH_Req, the count value (NAS uplink Count) of the counter may be usually carried in the V payload of the message for transmission.

Step S103: The N3IWF generates first verification code based on the first security key.

In this embodiment of this application, the N3IWF generates the first verification code AUTH1' based on the obtained first security key Ks. For example, AUTH1'=prf (prf (Ks, "Key Pad for IKEv2"), <ResponserSignedOctets>). For descriptions of a process of generating AUTH1' and a parameter used in the process, refer to related detailed descriptions in step S102. Details are not described herein again.

Step S104: The N3IWF determines whether the first authentication code matches the first verification code.

Step S105: When determining that the first authentication code matches the first verification code, the N3IWF sends a first response message to the UE, where the network access response message carries second authentication code, and the second authentication code is used by the UE to perform security authentication on the N3IWF.

In the solutions of this application, the N3IWF determines whether the generated first verification code AUTH1' is the same as the first authentication code AUTH1 carried in IKE_AUTH_Req. If the generated first verification code AUTH1' is the same as the first authentication code AUTH1 carried in IKE_AUTH_Req, it indicates that the security authentication performed by the N3IWF on the UE succeeds, and the N3IWF continues to perform step S105 to send the first response message IKE_AUTH_Response (also referred to as an Internet key exchange authentication response message) to the UE. The first response message IKE_AUTH_Response carries the second authentication code AUTH2, and the second authentication code AUTH2 is used by the UE to authenticate the N3IWF.

When the N3IWF determines that the first verification code AUTH1' is different from (mismatches) the first authentication code AUTH1, the procedure ends, or a normal non-3GPP-based network access authentication procedure is executed. Because the normal non-3GPP-based network access authentication procedure is described in the prior art, details are not described in this embodiment of the present invention.

It should be understood that IKE_AUTH_Response may further carry information such as the key identifier information, the UE temporary identifier, the identifier information of the N3IWF, and the first fresh protection parameter. This is not limited in this embodiment of the present invention.

In an embodiment of the present invention, before the N3IWF sends the first response message to the UE, the method further includes: the N3IWF generates the second authentication code based on the first security key.

After the N3IWF obtains the first security key Ks, the N3IWF may generate the second authentication code AUTH2 based on the first security key and the sent IKE_SA_INIT response message. Similarly, the N3IWF may generate the second authentication code AUTH2 based on the first security key and optionally some other parameter information (for example, some parameters carried in the IKE_SA_INIT response message or derivation parameters of the some parameters). For example, AUTH2=prf (prf (Ks, "Key Pad for IKEv2"), <ResponserSignedOctets>). <ResponseSignedOctets> is calculated based on some parameter information (for example, KEr) in the IKE_SA_INIT response message (assuming that the message is denoted as an IKE_SA_INIT2 message) and some derivation parameters of the some parameter information. Because calculation of <ResponseSignedOctets> is described in the prior art, related details are not described herein. For parameter information used in a process of generating the second authentication code AUTH2, refer to related detailed descriptions in step S102. Details are not described herein again.

Step S106: Correspondingly, the UE receives the first response message returned by the N3IWF based on the first request message, where the first response message carries the second authentication code, and the second authentication code is used by the UE to perform security authentication on the N3IWF. The UE generates second verification code based on the first security key corresponding to the UE.

In the solutions of this application, the UE receives the first response message IKE_AUTH_Response sent by the N3IWF, and obtains, by parsing the message, parameter information such as the second authentication code AUTH2 carried in the IKE_AUTH_Response message. The UE may generate the corresponding second verification code AUTH2' based on the foregoing first security key Ks. Similarly, the UE may generate the second authentication code AUTH2 based on the first security key and optionally some other parameter information (for example, some parameters carried in the IKE_SA_INIT response message or derivation parameters of the some parameters). For example, AUTH2'=prf (prf (Ks, "Key Pad for IKEv2"), <ResponserSignedOctets>). For a process of generating the second verification code AUTH2', refer to related descriptions in step S105. Details are not described herein again.

Step S107: The UE determines whether the second authentication code matches the second verification code.

In the solutions of this application, the UE determines whether the second authentication code AUTH2 is the same as the generated second verification code AUTH2'. If the second authentication code AUTH2 is the same as the generated second verification code AUTH2', the security authentication performed by the UE on the N3IWF succeeds. Otherwise, the procedure ends, and the security authentication performed by the UE on the N3IWF fails. Optionally, the UE may alternatively attempt to access the network again by using a normal non-3GPP-based network access authentication procedure. Because the normal non-3GPP-based network access authentication procedure is described in the prior art and is not related to this embodiment of the present invention, details are not described herein again.

Step S108: Determine that security authentication performed by the UE on the N3IWF succeeds.

It should be understood that when step S108 is performed, mutual security authentication between the UE and the N3IWF has been completed, and establishment of the secure channel (for example, an IPsec tunnel) between the UE and the network side is also completed.

Figure 5:
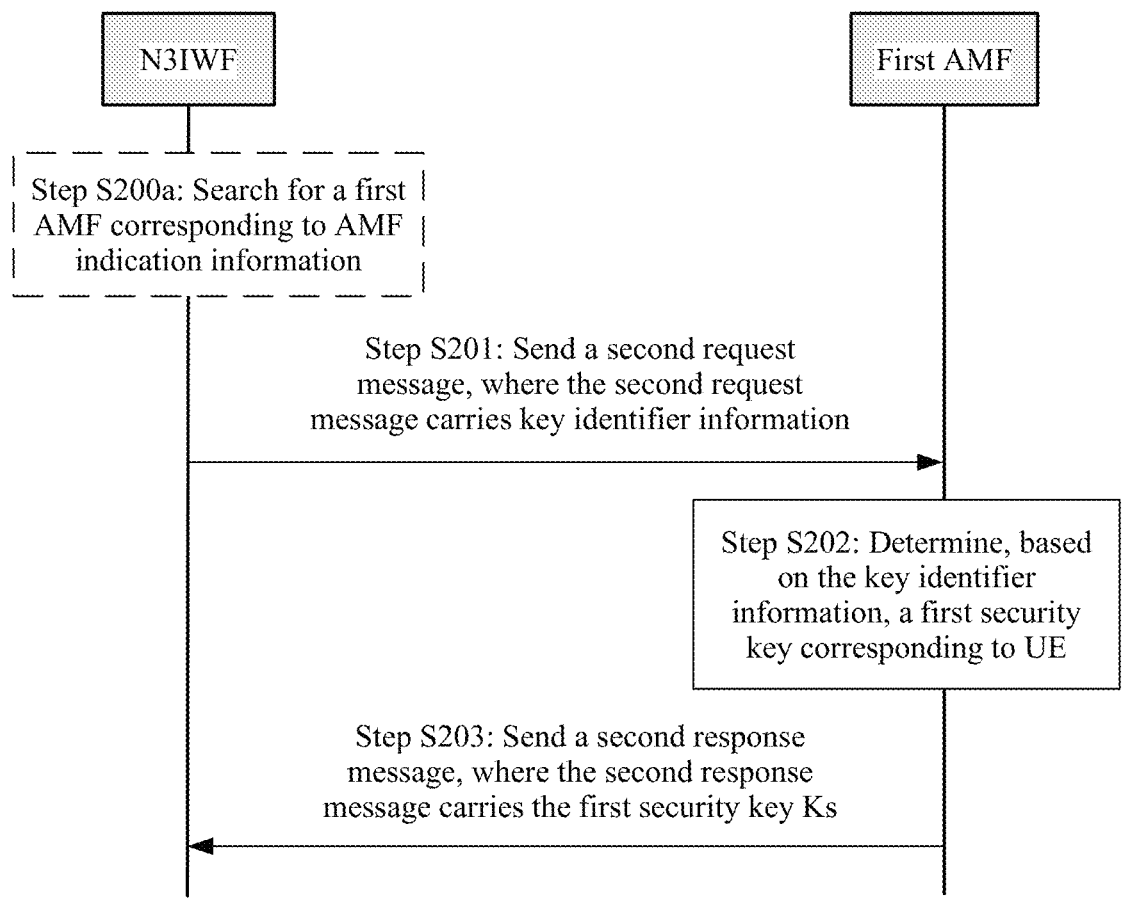

In an embodiment of the present invention, with reference to the embodiment in FIG. 4A and FIG. 4B, after step S102 and before step S103, the method may further include the following implementation steps. Specifically, FIG. 5 is a schematic flowchart of another method for performing network access authentication based on a non-3GPP network according to an embodiment of the present invention.

Step S201: When the N3IWF finds the first AMF indicated by the AMF indication information, the N3IWF sends a second request message to the first AMF indicated by the AMF indication information, where the second request message carries the key identifier information. Correspondingly, the first AMF receives the second request message sent by the N3IWF.

In the solutions of this application, before the N3IWF sends the first security key request message to the first AMF indicated by the AMF indication information, the method further includes step S200a: The N3IWF determines, based on the AMF indication information in the first request message, the first AMF indicated by the AMF indication information.

It should be understood that the AMF indication information may include the UE temporary identifier, the NAI information, or other information that is used to indicate an AMF that determines to perform bidirectional security authentication with the UE. The UE temporary identifier includes information about an AMF used when the UE successfully accesses the network last time. The NM information may also indicate the information about the AMF used when the UE successfully accesses the network last time. The N3IWF searches for and determines, by using the AMF indication information (for example, the UE temporary identifier or the NAI information) in IDi of the first request message IKE_AUTH_Req, the first AMF indicated by the AMF indication information.

For example, the UE temporary identifier in LTE is a GUTI, and the GUTI includes MME identity information.

An eNB may find a corresponding MME by using the identity information. Alternatively, in LTE, the UE uses NAI as IDi and sends the NAI to an ePDG, and the ePDG searches for an MME by using content of the NAI. Similarly, in 5G, if IKE_AUTH_Req received by the N3IWF has carried the UE temporary identifier or the NAI information, the N3IWF may find a related AMF based on the temporary identifier or the NAI information, namely, the first AMF.

It should be understood that the second request message may further carry the first authentication code AUTH1, the key identifier, the first fresh protection parameter such as the identifier information of the N3IWF or the count value (NAS Uplink Count) of the counter, registration type indication information (also referred to as network access type indication information) that indicates whether the UE currently accesses the network based on non-3GPP for the first time or not, or other parameter information. This is not limited in this embodiment of the present invention.

Step S202: The first AMF determines, based on the key identifier information, the first security key corresponding to the UE.

In the solutions of this application, the first AMF may store a plurality of pieces of security context information of a plurality of UEs (corresponding to UE temporary identifiers), and each UE may correspondingly have one or more pieces of security context information. Therefore, if the key identifier information does not include the UE temporary identifier, the second request message further needs to carry the UE temporary identifier. After receiving the second request message, the first AMF obtains, by parsing the message, the UE temporary identifier carried in the second request message, and optionally, may further obtain the key identifier information such as a key identifier, or other parameter information. Then, the first AMF finds, from the prestored plurality of pieces of security context information of the plurality of UEs based on the UE temporary identifier carried in the second request message, one or more pieces of security context information corresponding to the UE temporary identifier. Subsequently, the first AMF finds, based on the key identifier information (assuming that the key identifier information is a key identifier) from the one or more pieces of security context information corresponding to the UE temporary identifier, security context information that is of the UE and that is corresponding to the key identifier information.

It should be understood that, if the first AMF stores one piece of corresponding security context information for each UE, the first AMF may directly find, based on the UE temporary identifier carried in the second request message, the security context information that is of the UE and that is corresponding to the UE temporary identifier, namely, the security context information stored in the UE after the UE successfully accesses the network last time.

Further, the first AMF determines corresponding information about the first security key based on the found security context information of the UE and with reference to parameter information such as the first fresh protection parameter (the identifier information of the N3IWF or the NAS uplink count) carried in the second request message. The information about the first security key includes a derivation parameter used to derive the first security key or directly includes the first security key.

It should be understood that, when the information about the first security key includes the derivation parameter used to derive the first security key, this scenario is applicable to a case in which the first security key is derived by using a key Kamf, or a case in which an AMF and an SEAF are deployed together (in this case, internal interaction between the AMF and the SEAF is ignored, and the SEAF is considered as a part of the AMF). If the AMF and the SEAF are not deployed together, after the AMF finds the UE, if Kseaf needs to be used as a basic key to derive the first security key Ks, the AMF may need to continue to search the SEAF for key information (that is, search for the security context information of the UE) related to the UE. The AMF needs to provide identity information (the UE temporary identifier) of the UE and another key input parameter for the SEAF, for example, the first fresh protection parameter such as the identifier information of the N3IWF or the NAS uplink count. The SEAF derives/derives the first security key Ks based on the first fresh protection parameter and the basic key Kseaf, and sends the first security key Ks to the first AMF.

In a first implementation, the first AMF directly uses, as the first security key Ks, a NAS integrity key or a user plane integrity protection key in the found security context information of the UE.

In a second implementation, the first AMF determines the security key in the found security context information of the UE, the first fresh protection parameter, and optionally some other parameter information as derivation parameters used to derive the first security key. Further, the first AMF generates the first security key Ks based on the derivation parameters such as the security key in the security context information and the first fresh protection parameter.

It should be understood that the first AMF may further generate corresponding first key identifier information for the first security key Ks. The first key identifier information is used to identify the first security key, or is used to identify a type of key of a same type as the first security key. The first security key identifier information may be a specific string, a digit of several bits, or the like. Generation of the first key identifier information is related to specific implementation. Details are not described herein.

It should be noted that, for a specific process of generating the first security key, refer to related detailed descriptions of generating the first security key in the embodiment in FIG. 4A and FIG. 4B. Details are not described herein again. Similarly, for related descriptions of the security key and the first fresh protection parameter, refer to related detailed descriptions in the embodiment in FIG. 4A and FIG. 4B. Details are not described herein again.

Step S203: The first AMF sends a second response message to the N3IWF, where the second response message carries the first security key. Correspondingly, the N3IWF receives the second response message sent by the first AMF, where the second response message carries the first security key.

It should be understood that the second response message may carry the first security key Ks, and optionally, may further carry key identifier information KSIks corresponding to Ks, identifier information of the first AMF, the security key in the security context information, the identifier information of the N3IWF, the count value (NAS uplink count) of the counter, the first fresh protection parameter, other parameter information, or the like. This is not limited in this embodiment of the present invention.

Figure 6:
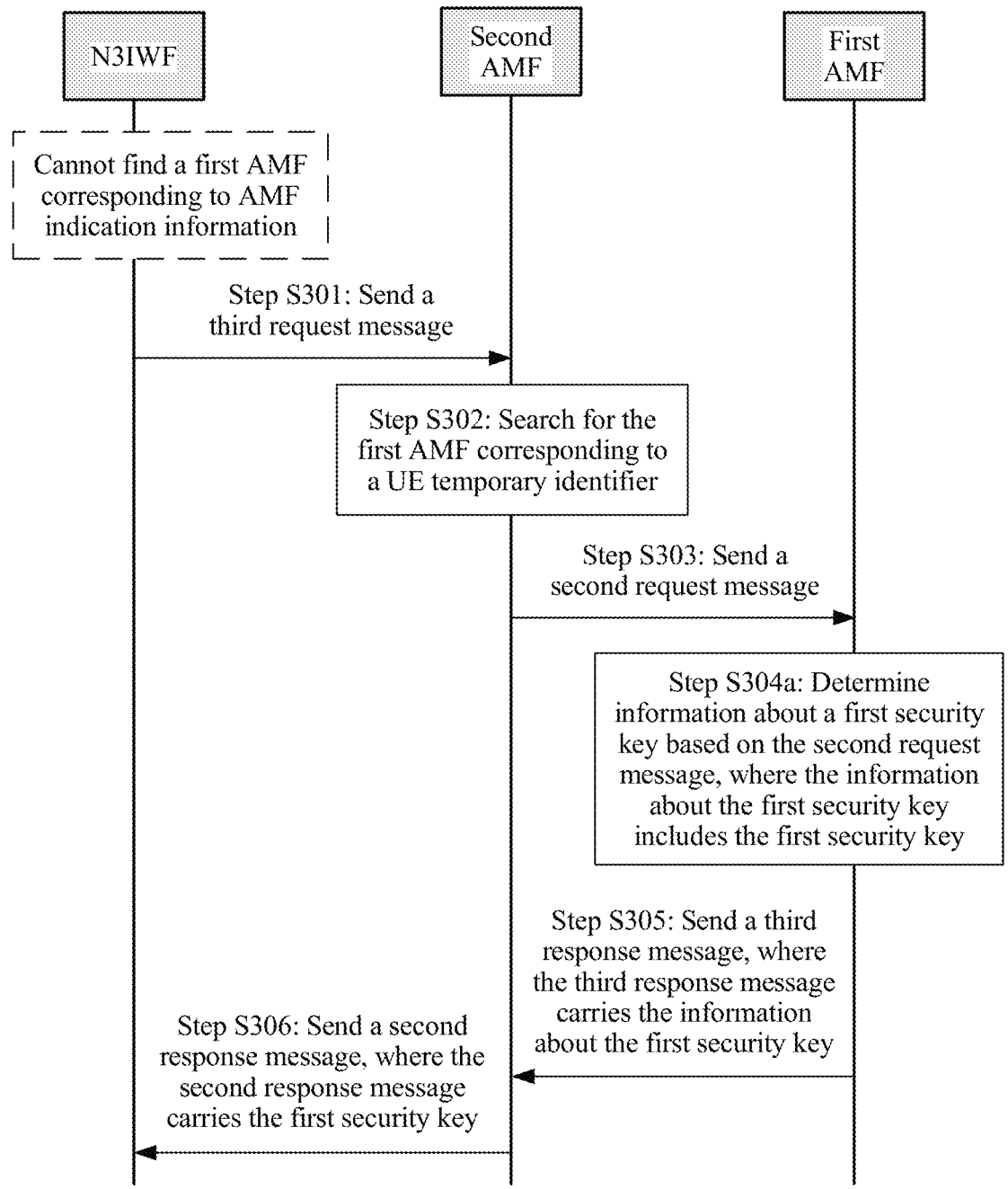

In another embodiment of the present invention, with reference to the embodiment in FIG. 4A and FIG. 4B, after step S102 and before step S103, the method may further include the following implementation steps. Specifically, FIG. 6 is a schematic flowchart of another method for performing network access authentication based on a non-3GPP network according to an embodiment of the present invention.

Step S301: When the N3IWF cannot find the first AMF indicated by the AMF indication information, the N3IWF sends a third request message to a second AMF, where the third request message carries the key identifier information.

In the solutions of this application, due to network configuration, a quantity of AMFs that can be communicatively connected to the N3IWF or a range of the AMF is limited. For example, an operator may configure that the N3IWF is allowed to search for an AMF at a network edge and the N3IWF is not allowed to connect to an AMF at a network center. Therefore, the N3IWF possibly cannot find the first AMF indicated by the AMF indication information.

Figure 7:
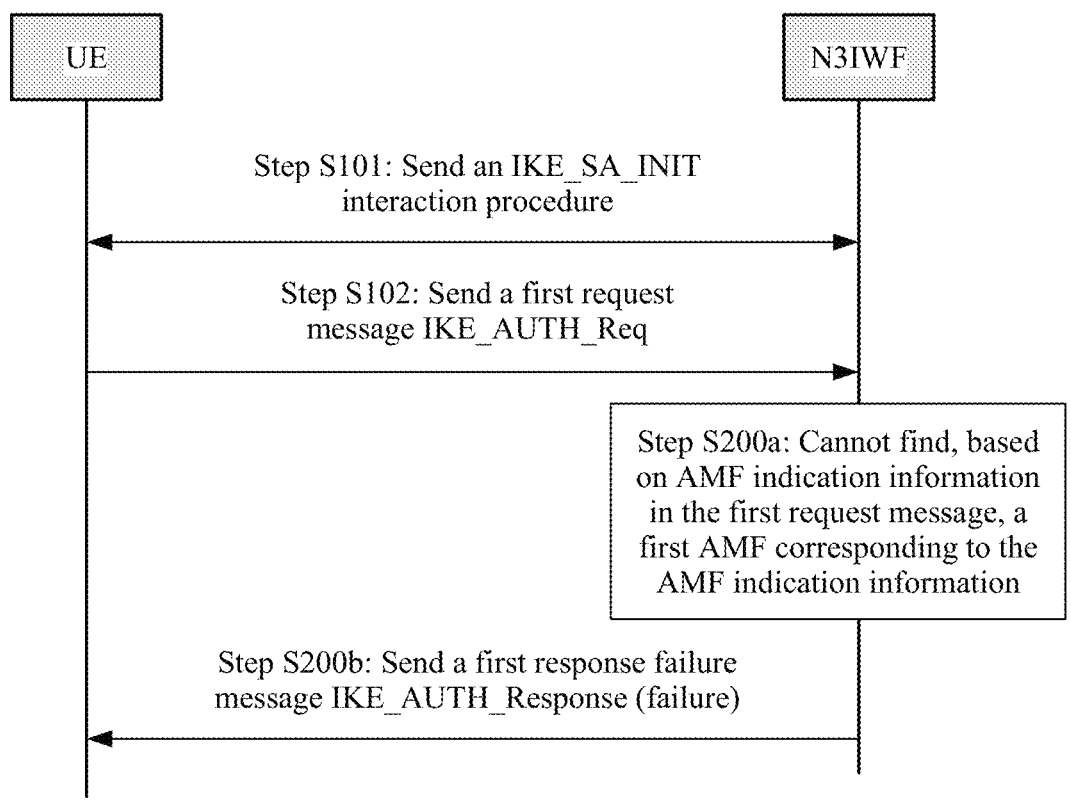

In an embodiment of the present invention, FIG. 7 is a schematic flowchart of another method for performing network access authentication based on a non-3GPP network according to an embodiment of the present invention. After step S102, the method further includes step S200a and step S200b. When the N3IWF cannot find the first AMF indicated by the AMF indication information, the procedure may end, or the N3IWF may send a first response failure message IKE_AUTH_Response (failure) to the UE. Optionally, after receiving the IKE_AUTH_Response (failure) message returned by the N3IWF, the UE may perform network access authentication again based on a normal non-3GPP-based network access authentication procedure.

In still another embodiment of the present invention, when the N3IWF cannot find the first AMF indicated by the AMF indication information, the N3IWF sends the third request message to the second AMF, so that the second AMF sends a second request message to the first AMF indicated by the AMF indication information.

In actual application, the N3IWF internally maintains a pre-configured list of connectable AMFs, and the list of AMFs includes one or more AMFs to which the N3IWF can be connected. The N3IWF may randomly select one or more AMFs from the list of AMFs as the second AMF. Alternatively, the N3IWF may find the corresponding second AMF by using a domain name system (DNS) server. Then, the N3IWF may send the third request message to the second AMF. The third request message may carry parameter information such as the UE temporary identifier and the key identifier information.

Step S302: Correspondingly, the second AMF receives the third request message sent by the N3IWF, and searches for, based on the UE temporary identifier carried in the third message, the first AMF corresponding to the UE temporary identifier.

Correspondingly, the second AMF receives the third request message sent by the N3IWF. Similarly, when the key identifier information does not include UE temporary information, the third request message further needs to carry the UE temporary identifier, and the second AMF obtains, by parsing the message, parameter information such as the UE temporary identifier and the key identifier information carried in the third request message, and optionally other parameter information. Then, the second AMF determines whether an AMF corresponding to the UE temporary identifier is the second AMF. If the AMF corresponding to the UE temporary identifier is not the second AMF, the second AMF finds, based on AMF identifier information included in the UE temporary identifier, the first AMF corresponding to the UE temporary identifier.

It should be noted that, for a process of searching for the first AMF, refer to related detailed descriptions in the embodiment in FIG. 5. Details are not described herein again.

It should be understood that, when the second AMF cannot find the first AMF corresponding to the UE temporary identifier, the procedure ends, or the N3IWF sends a first response failure message IKE_AUTH_Response (failure) to the UE. Similarly, after receiving the IKE_AUTH_Response (failure) message returned by the N3IWF, the UE may perform network access authentication again based on a normal non-3GPP-based network access authentication procedure, to attempt to access the network.

Step S303: The second AMF sends the second request message to the first AMF, where the second request message carries the key identifier information. Correspondingly, the first AMF receives the second request message sent by the second AMF.

In the solutions of this application, the second AMF may generate the corresponding second request message by using the UE temporary identifier, the key identifier information, and other parameter information that are obtained by parsing the third request message, and optionally some other parameter information (for example, identifier information of the second AMF), and send the second request message to the first AMF corresponding to the UE temporary identifier. Correspondingly, the first AMF receives the second request message sent by the second AMF. The second request message carries parameter information such as the key identifier information and the UE temporary identifier.

It should be understood that the second request message and the third request message may further carry the first authentication code AUTH1, the first fresh protection parameter, the first random number, the identifier information (the IP address of the N3IWF, the ID of the N3IWF, or the like) of the N3IWF, the count value (NAS_uplink Count Number) of the counter, registration type indication information (also referred to as network access type indication information) that indicates whether the UE currently accesses the network based on non-3GPP for the first time or not, or other parameter information. This is not limited in this embodiment of the present invention.

Step S304: The first AMF determines, based on the key identifier information, information about the first security key corresponding to the UE, where the information about the first security key includes the first security key or a derivation parameter used to derive the first security key.

In a first implementation, a specific implementation of step S304 is step S304a: The first AMF determines, based on the key identifier information, the first security key corresponding to the UE. For a process of determining the first security key Ks, refer to related detailed descriptions of step S202 in the embodiment in FIG. 5. Details are not described herein again.

In a second implementation, a specific implementation of step S304 is step S304b: The first AMF determines, based on the key identifier information, information about the first security key corresponding to the UE, where the information about the first security key includes a derivation parameter used to derive the first security key. For a process of determining the information about the first security key, refer to related detailed descriptions of step S202 in the embodiment in FIG. 5. Details are not described herein again.

It should be understood that, when the second request message and the third request message each further carry the first fresh protection parameter (for example, the identifier information of the N3IWF or the NAS uplink count), the derivation parameter includes the security context information (for example, a security key) of the UE and the first fresh protection parameter, and optionally, may further include some other parameter information (for example, a NAS algorithm) and the like. This is not limited in this embodiment of the present invention.

It should be noted that the information about the first security key or the derivation parameter herein may include the security context information of the UE (for example, the UE temporary identifier, the key identifier information, the security key, and the security algorithm), and may further include the first fresh protection parameter such as the identifier information of the N3IWF or the count value (NAS uplink count) of the counter, or other parameter information. This is not limited in this embodiment of the present invention.

Step S305: The first AMF sends a third response message to the second AMF, where the third response message carries the information about the first security key. Correspondingly, the second AMF receives the third response message sent by the first AMF.

In the solutions of this application, the first AMF generates the corresponding third response message by using the determined information about the first security key. The third response message carries the information about the first security key. The first AMF may send the third response message to the second AMF. Correspondingly, the second AMF receives the third response message sent by the first AMF.

Step S306: The second AMF sends a second response message to the N3IWF, where the second response message carries the first security key. Correspondingly, the N3IWF receives the second response message sent by the second AMF.

In actual application, with reference to the first implementation, namely, step S304a, of step S304, when the information about the first security key includes the first security key, the second AMF may directly forward (send), to the N3IWF as the second response message, the received third response message sent by the first AMF. Alternatively, the second AMF may generate the second response message based on the first security key Ks carried in the received third response message and optionally some other parameter information (for example, the identifier information of the second AMF), and then send the second response message to the N3IWF. Correspondingly, the N3IWF receives the second response message sent by the second AMF. The second response message carries at least the first security key.

In actual application, with reference to the second implementation, namely, step S304b, of step S304, when the information about the first security key includes the derivation parameter used to derive the first security key, before the second AMF sends the second response message to the N3IWF, the method further includes step S306': The second AMF generates the corresponding first security key Ks based on the derivation parameter. For a process of determining the first security key Ks, refer to related detailed descriptions of step S202 in the embodiment in FIG. 5. Details are not described herein again.

Figure 8:
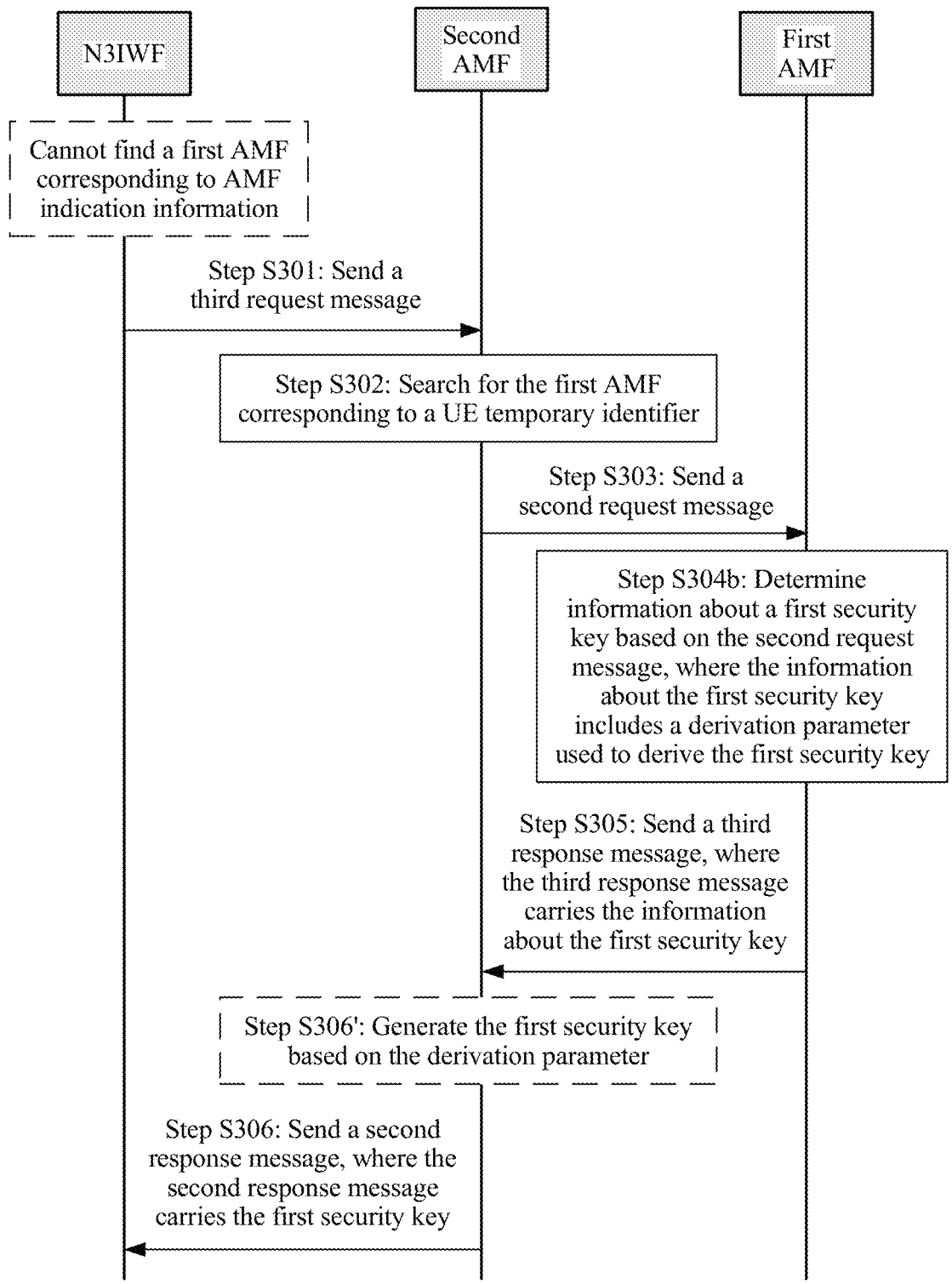

After the second AMF generates the first security key Ks, the second AMF may generate the corresponding second response message by using the generated first security key Ks and optionally some other parameter information (for example, a parameter in the security context information or the first fresh protection parameter), and send the second response message to the N3IWF. Correspondingly, the N3IWF receives the second response message sent by the second AMF. The second response message carries at least the first security key, and optionally, may further carry other parameter information. Specifically, FIG. 8 is a schematic flowchart of another method for performing network access authentication based on a non-3GPP network according to an embodiment of the present invention.

It should be noted that, for related descriptions of the second response message, refer to related detailed descriptions of step S203 in the embodiment in FIG. 5. Details are not described herein again.

Figure 9:
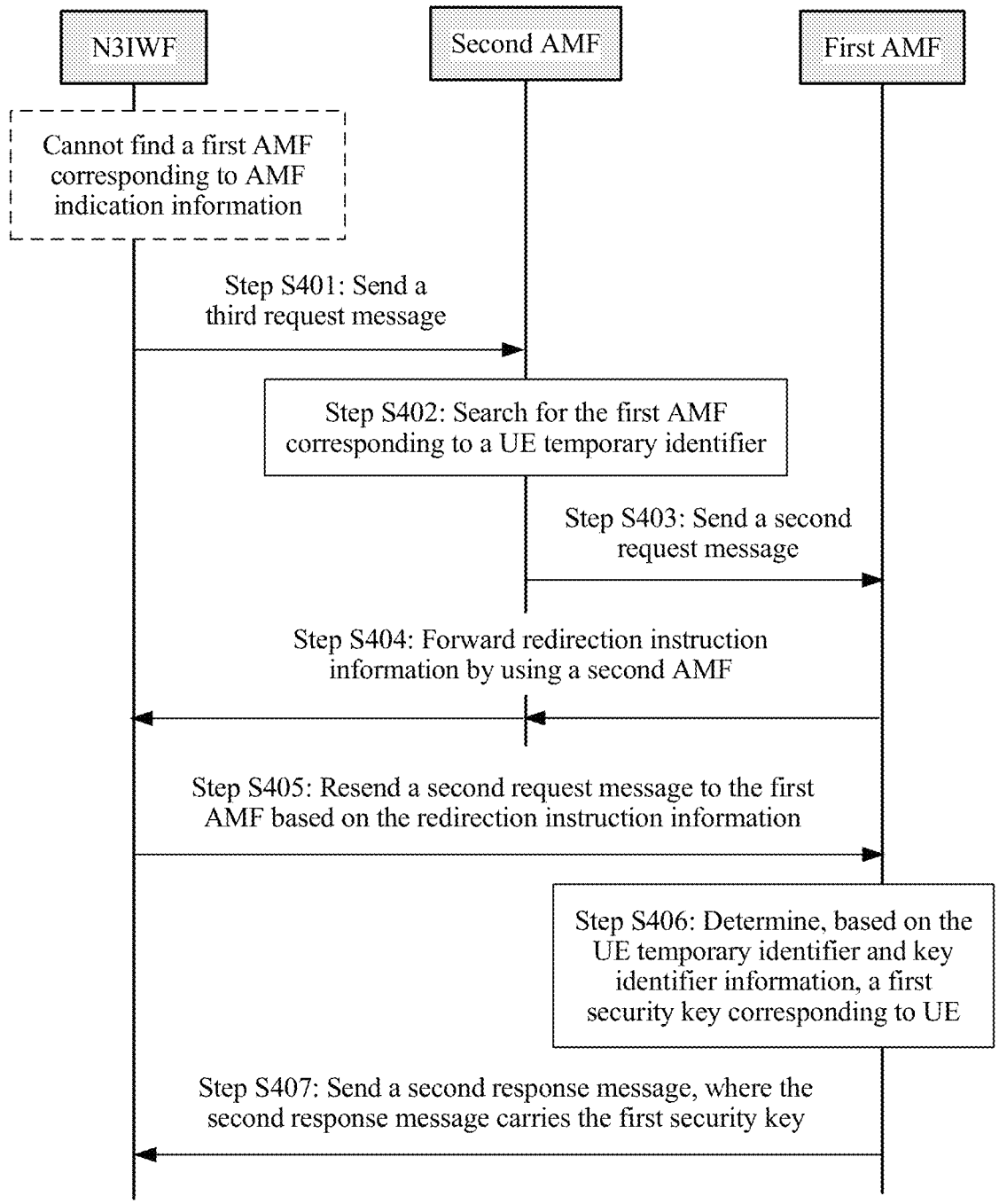

In another embodiment of the present invention, with reference to the embodiment in FIG. 4A and FIG. 4B, after step S102 and before step S103, the method may further include the following implementation steps. Specifically, FIG. 9 is a schematic flowchart of another method for performing network access authentication based on a non-3GPP network according to an embodiment of the present invention.

Step S401: When the N3IWF cannot find the first AMF indicated by the AMF indication information, the N3IWF sends a third request message to a second AMF, where the third request message carries the key identifier information.

Step S402: Correspondingly, the second AMF receives the third request message sent by the N3IWF, and searches for, based on the UE temporary identifier carried in the third message, the first AMF corresponding to the UE temporary identifier.

Step S403: The second AMF sends a second request message to the first AMF, where the second request message carries the key identifier information. Correspondingly, the first AMF receives the second request message sent by the second AMF.

It should be noted that, for a specific implementation of step S401 to step S403, refer to related detailed descriptions of step S301 to step S303 in the embodiment in FIG. 6. Details are not described herein again.

Step S404: The first AMF sends redirection instruction information to the N3IWF by using the second AMF, where the redirection instruction information carries address information of the first AMF, and the redirection instruction information is used to instruct the N3IWF to resend a second request message to the first core network network element.

Step S405: Correspondingly, the N3IWF receives the redirection instruction information that is forwarded by the second AMF and that is sent by the first AMF. The N3IWF sends the second request message to the first AMF based on the redirection instruction information, where the second request message carries the key identifier information.

In the solutions of this application, when the first AMF receives the second request message sent by the second AMF, the first AMF may send the redirection instruction information Identification Response to the N3IWF by using the second AMF. The redirection instruction information Identification Response is used to instruct the N3IWF to re-establish a communication connection to the first AMF, to retransmit the second request message. Correspondingly, the N3IWF receives the redirection instruction information Identification Response forwarded by the first AMF by using the second AMF, and resends the second request message to the first AMF based on an instruction of the Identification Response.

Step S406: Correspondingly, the first AMF receives the second request message sent by the N3IWF. The first AMF determines, based on the key identifier information, the first security key corresponding to the UE.

It should be understood that, step S406 that the first AMF determines, based on the UE temporary identifier and the key identifier information, the first security key corresponding to the UE may alternatively be performed after step S403, or may be performed after step S405 that the first AMF receives the second request message sent by the N3IWF. This is not limited in this embodiment of the present invention.

Step S407: The first AMF sends a second response message to the N3IWF, where the second response message carries the first security key. Correspondingly, the N3IWF receives the second response message sent by the first AMF, where the second response message carries the first security key.

It should be noted that, for descriptions of the first security key and the second response message, refer to related detailed descriptions in the embodiment in FIG. 5. Details are not described herein again.

Figure 10:
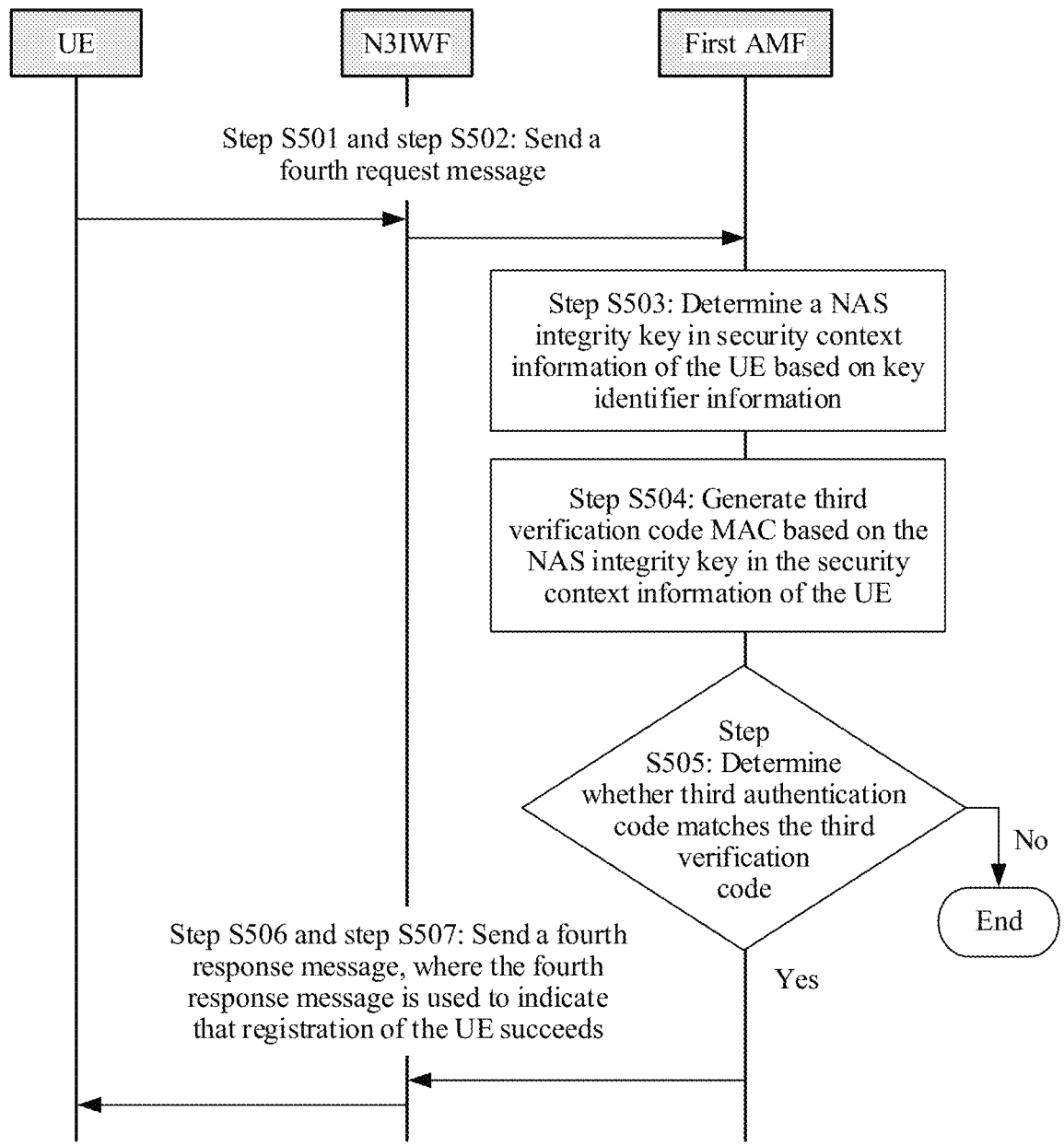
FIG. 10 and FIG. 11 are schematic flowcharts of two methods in which a first access and mobility management function network element (first AMF) performs security authentication on UE according to an embodiment of the present invention.

In another embodiment of the present invention, with reference to the embodiments in FIG. 4A to FIG. 9, after step S108, the method may further include the following implementation steps. Specifically, FIG. 10 is a schematic flowchart of a method in which a first AMF performs security authentication on UE according to an embodiment of the present invention.

Step S501: The UE sends a fourth request message to the NSIWF, where the fourth request message is carried in the Internet protocol security IPsec (Internet Protocol Security, IPsec) protocol, the fourth request message carries third authentication code and the key identifier information, and the third authentication code is used by the first AMF to perform security authentication on the UE. Correspondingly, the NSIWF receives the fourth request message sent by the UE.

In the solutions of this application, the UE sends the fourth request message to the NSIWF on a secure channel (for example, an IPsec tunnel), so that the first AMF can perform security authentication on the UE. The fourth request message herein is a NAS message, and is carried in the IPsec protocol for transmission.

It should be understood that the fourth request message herein may be a registration request Registration request message, a service request Service Request message, a tracking area update (Tracking area update, TAU) request message, or a request message in another procedure. This is not limited in this embodiment of the present invention.

For example, if the fourth request message herein is a registration request message, the registration request message may include registration parameters Registration parameters. The registration parameters may include the UE temporary identifier, the key identifier information, the registration type indication information RT, a second fresh protection parameter, or other parameter information. In addition, the registration request message further carries the third authentication code MAC or other parameter information. This is not limited in this embodiment of the present invention. In actual application, the registration parameters may be placed in a V payload or an N payload of the message.

Similarly, if the fourth request message is a message in another procedure that includes but is not limited to a registration request Registration request procedure, a difference lies only in that the fourth request message carries parameters in another procedure, for example, Service Request parameters or TAU parameters.

It should be understood that the fourth request message in another procedure already includes the third authentication code and parameters in the another procedure, and the registration request message in the registration request procedure includes only the registration parameters, and does not include the third authentication code. Therefore, when the fourth request message is a registration request message, in addition to including the registration parameters in the registration request message, the fourth request message further needs to include/carry the third authentication code.

In an embodiment of the present invention, before the UE sends the fourth request message to the first AMF indicated by the AMF indication information, the method further includes: the UE generates the third authentication code based on the NAS integrity key in the security context information of the UE.

In actual application, the UE may generate the fourth request message (for example, a registration request Registration request message) by using the UE temporary identifier, the key identifier information, the registration type indication message, and optionally some other parameter information (for example, the second fresh protection parameter or the security context information stored in the UE). Then, the UE may protect the fourth request message (for example, a registration request Registration request message) by using a second security key (for example, the NAS integrity key or the encryption key) in the security context information, and generates and calculates the third authentication code MAC. To be specific, the UE may generate the third authentication code MAC (Message authentication code, also referred to as message authentication code) based on the security context information stored in the UE after the UE successfully accesses the network last time, for example, the UE temporary identifier, the key identifier information, the second security key Kq, and a security algorithm f1, and with reference to the registration type indication information RI (network access type indication information, namely, first-time network access or non-first-time network access) indicating that the UE currently accesses the network based on non-3GPP, and optionally some other parameter information (for example, the second fresh protection parameter). For example, MAC=EIA1 (the NAS integrity key, the second fresh protection parameter (for example, the NAS uplink count), and a parameter that is shared between the UE and the AMF and that is unknown to a third party (for example, a GUTI, a registration type, or a parameter that is subsequently newly defined, for example, an access manner indicator). For another example, a generation method in LTE is that MAC=EIA1 (the NAS integrity key, the Registration request message (which includes the third authentication code AMC), the count value (NAS uplink count) of the counter, a message direction, and bearer information). For another example, MAC=EIA1 (the NAS integrity protection key and registration parameters). EIA is an integrity protection algorithm (EPS Integrity Algorithm) used in an EPS network, for example, EIA0, EIA1, EIA2, or EIA3. The message direction indicates whether the Registration request message is an uplink message or a downlink message, and may be usually represented by a specific string, for example, "0" represents a downlink message, and "1" represents an uplink message. A bearer message indicates a transmission channel of a message, namely, a channel on which the message is transmitted. The registration parameters are registration parameters carried in the V payload or the N payload of the first request message.

It should be understood that the security context information herein includes the second security key Kq and the security algorithm. The second security key may be the NAS integrity key, the encryption key, the NAS key, or the like in the security context information. The security algorithm may be the integrity protection algorithm, the encryption algorithm, a NAS algorithm, or another algorithm in the security context information. This is not limited in this embodiment of the present invention.

It should be understood that the second fresh protection parameter herein may include parameter information such as a second random number and the count value (NAS uplink count) of the counter. The first fresh protection parameter and the second fresh protection parameter may be a same parameter, or may be different parameters. This is not limited in this embodiment of the present invention.

Step S502: The N3IWF sends the fourth request message to the first AMF, where the fourth request message is carried in the NG2 protocol. Correspondingly, the first AMF receives the fourth request message sent by the N3IWF.

In the solutions of this application, after the N3IWF receives the fourth request message (NAS message) that is sent by the UE and that is carried in the IPsec protocol, the N3IWF may extract the fourth request message from the IPsec protocol. Further, the N3IWF adds the fourth request message into the NG2 (Next Generation interface Number 2) protocol, and sends the fourth request message to the first AMF. Correspondingly, the first AMF receives the fourth request message that is sent by the N3IWF and that is carried in the NG2 protocol.

It should be understood that, NG2 is an interface used to connect the N3IWF and the AMF, so that the N3IWF and the AMF communicate with each other.

Step S503: The first AMF determines the NAS integrity key in the security context information of the UE based on the key identifier information.

In the solutions of this application, the first AMF receives the fourth request message sent by the N3IWF, and obtains, by parsing the message, parameter information such as the third authentication code MAC, the UE temporary identifier, the key identifier information, the registration type indication information RT, and the second fresh protection parameter carried in the fourth request message. The first AMF may find the security context information of the UE based on the UE temporary identifier and the key identifier information. For a process of searching for the security context information, refer to related detailed descriptions of step S202 in the embodiment in FIG. 5. Details are not described herein again.

Step S504: The first AMF generates third verification code based on the NAS integrity key in the security context information of the UE.

In the solutions of this application, the first AMF generates the third verification code MAC' based on the UE temporary identifier, the key identifier information, the second security key Kq (for example, the NAS integrity key), the security algorithm f1, the registration type indication information RT, the second fresh protection parameter, and optionally some other parameter information.

In actual application, the first AMF uses necessary parameter information such as the UE temporary identifier, the key identifier information, the registration type indication information RT, and the second fresh protection parameter obtained by parsing the fourth request message, to generate a fourth request message (for example, a registration request Registration request message) that is the same as the fourth request message sent by the UE or the N3IWF. Then, the first AMF protects the generated fourth request message (for example, a Registration request) by using the second security key (for example, the NAS integrity key) in the security context information, and also generates and calculates the third verification code MAC'. For example, MAC'=EIA1 (the NAS integrity key, the second fresh protection parameter (for example, the NAS uplink count), and a parameter that is shared between the UE and the AMF and that is unknown to a third party (for example, a GUTI, registration type indication information registration type, or a parameter that is subsequently newly defined, for example, an access manner indicator). For another example, a generation method in LTE is that MAC=EIA1 (the NAS integrity key, the Registration request message (which includes the third authentication code AMC), the count value (NAS uplink count) of the counter, a message direction, and bearer information). For parameter information used in a process of generating MAC', refer to related detailed descriptions in step S501. Details are not described herein again.

Step S505: The first AMF determines whether the third verification code matches the third authentication code.

Step S506: When determining that the third verification code matches the third authentication code, send a fourth response message to the N3IWF, where the fourth response message is carried in the NG2 protocol, and the fourth response message is used to indicate that registration of the UE succeeds.

Step S507: Correspondingly, the N3IWF receives the fourth response message sent by the first AMF. The N3IWF sends the fourth response message to the UE, where the fourth response message is carried in the IPsec protocol, and the fourth response message is used to indicate that registration of the UE succeeds.

In the solutions of this application, the first AMF determines whether the third authentication code MAC is the same as the generated third verification code MAC'. If the third authentication code MAC is the same as the generated third verification code MAC', the first AMF sends the fourth response message (for example, a Registration response) to the NI3WF on the secure channel. The fourth response message is used to indicate that registration of the UE succeeds and the security authentication performed by the first AMF on the UE succeeds. Otherwise, the procedure ends, or the first AMF sends a fourth response failure message (for example, a Registration response failure) to the UE. The fourth response failure message is used to indicate that the security authentication performed by the first AMF on the UE fails and registration of the UE fails. The fourth response message or the fourth response failure message herein needs to be carried in the NG2 protocol for transmission.

Similarly, the N3IWF receives the fourth response message or the fourth response failure message that is sent by the first AMF, and adds the fourth response message or the fourth response failure message into the NG2 protocol and sends the message to the UE, to notify the UE whether registration succeeds.

After this embodiment of the present invention is implemented, the security context information stored after the UE successfully accesses the network last time can be used to complete current network access authentication performed by the UE based on non-3GPP, so that steps in a non-3GPP-based network access authentication procedure in the prior art are reduced, and the UE can quickly access the network.

Figure 11:
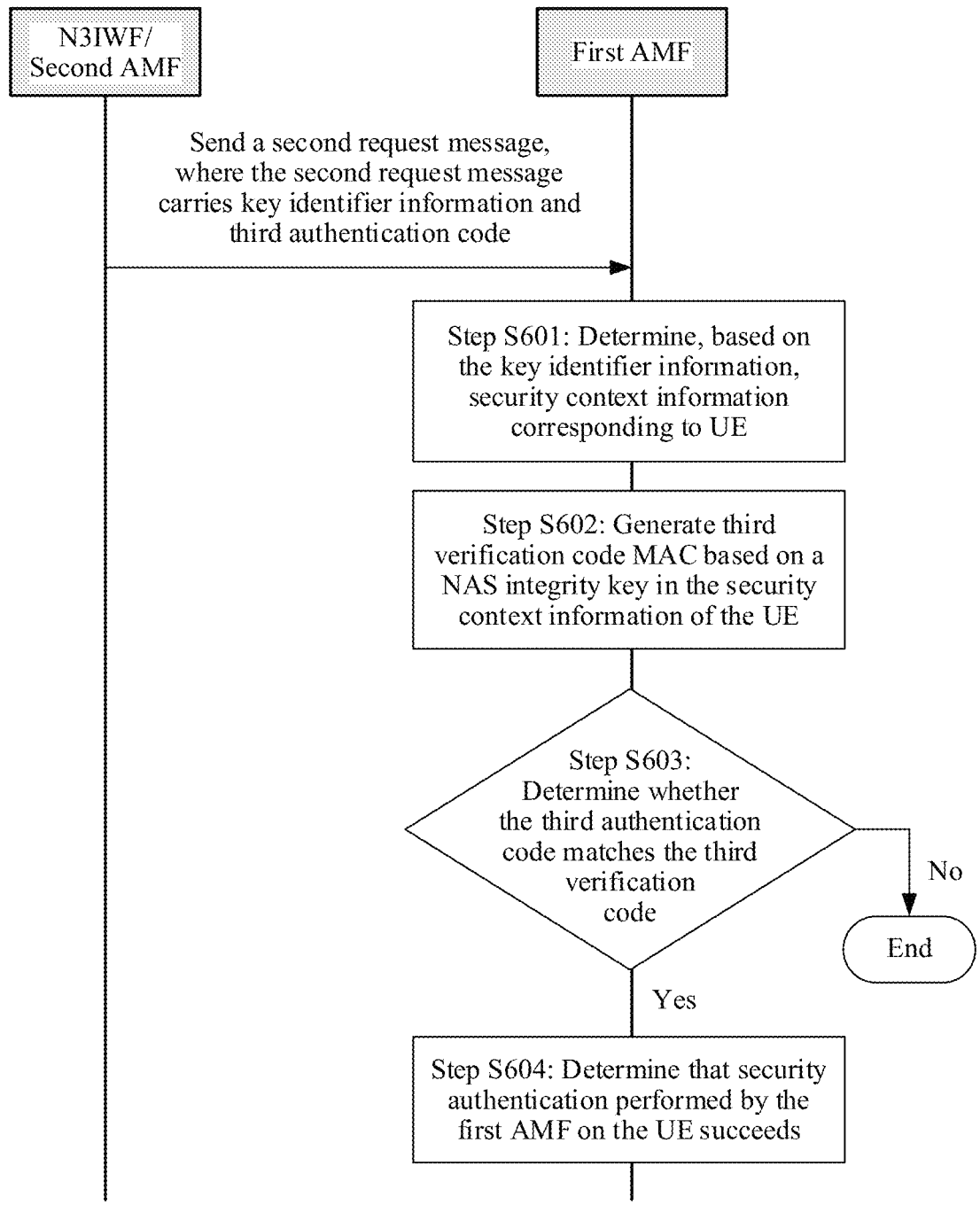

In another embodiment of the present invention, with reference to the embodiments in FIG. 4A to FIG. 9, when the first request message and the second request message each further carry third authentication code, before step S202, S304, or S406 that the first AMF determines, based on the key identifier information, the first security key corresponding to the UE or information about the first security key corresponding to the UE, the method further includes the following implementation steps. Specifically, FIG. 11 is a schematic flowchart of another method in which a first AMF performs security authentication on UE according to an embodiment of the present invention.

Step S601: The first AMF determines, based on the key identifier information, the security context information of the UE.

In the solutions of this application, when the first request message (IKE_AUTH_Req) and the second request message each further carry the third authentication code (MAC), before step S102 that the UE sends a first request message to the N3IWF, the method further includes: the UE generates the third authentication code based on the NAS integrity key in the security context information of the UE.

It should be understood that, similar to the process of generating the third authentication code in the embodiment in FIG. 10, the UE may first generate a registration request Registration request message by using the UE temporary identifier, the key identifier information, and optionally some other parameter information (for example, the security context information stored in the UE, a second fresh protection parameter, or the registration type indication message). Then, the UE protects the registration request Registration request message by using a second security key (for example, the NAS integrity key) in the security context information, and generates and calculates the third authentication code MAC. Alternatively, the UE may not generate a specific Registration request message, but uses a Registration parameter, that is used by the N3IWF to generate a Registration request and that is carried in the second request message, as input for generating the third authentication code MAC. If the UE initiates another procedure such as a service request procedure or a procedure similar to a tracking area update (TAU) procedure in LTE, the second message carries a parameter in a corresponding procedure, and the parameter is used by the N3IWF to generate a corresponding message. For example, the second message carries a service request parameter or a TAU parameter. If the UE constructs a complete Registration Request message and then generates MAC, the N3IWF needs to construct a Registration Request message that is totally the same as the message generated by the UE, and then sends the message to the first AMF. This requirement is also applicable to another procedure such as a service request procedure or a TAU procedure. For a process of generating the third authentication code, refer to related detailed descriptions in the embodiment in FIG. 10. Details are not described herein again.

Step S602: The first AMF generates third verification code based on the NAS integrity key in the security context information of the UE.

Step S603: The first AMF determines whether the third verification code matches the third authentication code.

Step S604: When determining that the third verification code matches the third authentication code, the first AMF determines that security authentication performed by the first AMF on the UE succeeds.

In the solutions of this application, when the first AMF determines that the third verification code MAC' matches the third authentication code MAC, it indicates that the security authentication performed by the first AMF on the UE succeeds, and the first AMF may correspondingly continue to perform step S202, step S304, or step S406, and subsequent related procedure steps in the foregoing embodiments.

It should be understood that the second request message sent by the N3IWF to the first AMF carries the third authentication code MAC, and optionally, may further carry the UE temporary identifier, the key identifier (or the key identifier information), the registration type indication information RT, the second fresh protection parameter, or other parameter information. This is not limited in this embodiment of the present invention.

It should be understood that, with reference to the embodiment in FIG. 10, the second request message herein includes a registration request Registration request message and the third authentication code MAC. For step S601 to step S603, refer to related detailed descriptions of step S501 to step S505 in the embodiment in FIG. 10. Details are not described herein again.

With reference to the embodiment in FIG. 10, the first request message in this embodiment of this application carries registration parameters. The registration parameters include parameter information such as the key identifier information, the UE temporary identifier, and the third authentication code (MAC). The second request message includes a registration request Registration request message and a key request message. The key request message is used to obtain the first security key for verifying the first authentication code AUTH1. The registration request message is generated by the N3IWF by using the registration parameters in the first request message, and the registration request message (or the registration parameters) is included in the first request message.

It should be noted that, parameter information such as the UE temporary identifier, the key identifier information, the NAI information, the registration type indication message, the second fresh protection parameter, and the count value (NAS uplink Count) of the counter used in the embodiments of the present invention may be placed in a V payload or an N payload of a corresponding message for transmission. Parameter information such as the first authentication code AUTH1, the first verification code AUTH1', the second authentication code AUTH2, and the second verification code AUTH2' used in the embodiments of the present invention may be placed in an authentication payload of a corresponding message.

After the embodiments of the present invention are implemented, the security context information stored after the UE successfully accesses the network last time can be used to complete current network access authentication performed by the UE based on non-3GPP, so that steps in a non-3GPP-based network access authentication procedure in the prior art are reduced, and the UE can quickly access the network.

Figure 12:
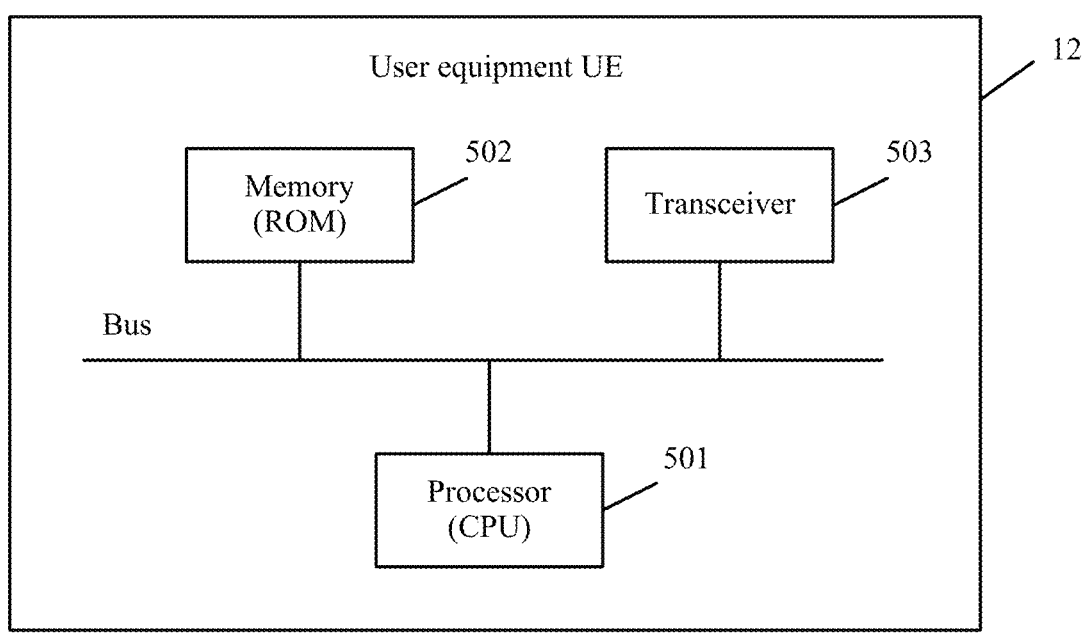
FIG. 12 to FIG. 14 are schematic structural diagrams of several types of user equipment UE according to an embodiment of the present invention.

Based on a same invention concept, FIG. 12 is a schematic structural diagram of user equipment according to an embodiment of the present invention. As shown in FIG. 12, the user equipment 12 includes a transceiver 501, a memory 502, and a processor 503 (there may be one or more processors 503, and one processor is used as an example in FIG. 12). In some embodiments of the present invention, the transceiver 501, the memory 502, and the processor 503 may be connected by using a bus or in another manner, and that a bus connection is used as an example in FIG. 12. The processor 503 invokes a program that is in the memory 502 and that is used to perform network access authentication based on a non-3GPP network, to perform the following operations:

obtain retained information that is of the UE and that exists after the UE successfully accesses a network last time;

determine access and mobility management function network element AMF indication information and a first security key based on the retained information of the UE;

generate first authentication code based on the first security key; send a first request message to a non-3GPP interworking function network element N3IWF by using the transceiver, where the first request message carries the first authentication code, the AMF indication information, and key identifier information, the first authentication code is used by the N3IWF to perform security authentication on the UE, and the key identifier information is used to obtain the first security key; and receive, by using the transceiver, a first response message returned by the N3IWF based on the first request message.

In some optional solutions, the first response message carries second authentication code, the second authentication code is generated by the N3IWF based on the first security key, and the processor is further configured to: generate second verification code based on the first security key; and if the second verification code matches the second authentication code, determine that security authentication performed by the UE on the N3IWF succeeds.

In some optional solutions, the retained information of the UE includes security context information, and the first security key is a NAS integrity key in the security context information.

In some optional solutions, the retained information of the UE includes security context information, and the first security key is a key derived based on a security key in the security context information and a first fresh protection parameter.

In some optional solutions, the security key includes a key Kseaf or a key Kamf, and the first fresh protection parameter includes any one of the following: a count value of a counter, a first random number, and a UE temporary identifier.

In some optional solutions, the AMF indication information is used to indicate a first AMF that performs mutual security authentication with the UE, and the AMF indication information includes the UE temporary identifier or network access identifier NAI information generated based on the UE temporary identifier.

In some optional solutions, the key identifier information includes the UE temporary identifier and/or a key identifier in the security context information of the UE.

In some optional solutions, after determining that the security authentication performed by the UE on the N3IWF succeeds, the processor is further configured to: send a fourth request message to the N3IWF by using the transceiver, where the fourth request message is carried in the Internet protocol security IPsec protocol, the fourth request message carries third authentication code and the key identifier information, and the third authentication code is used by the first AMF indicated by the AMF indication information to perform security authentication on the UE; and receive, by using the transceiver, a fourth response message sent by the N3IWF, where the fourth response message is carried in the Internet protocol security IPsec protocol, and the fourth response message is used to indicate that registration of the UE succeeds.

In some optional solutions, the first request message further carries third authentication code, and the third authentication code is used by the first AMF to perform security authentication on the UE.

In some optional solutions, the processor is further configured to: determine a NAS integrity key based on the retained information of the UE; and generate third authentication code based on the NAS integrity key, where the key identifier information is further used to obtain the NAS integrity key.

Figure 13:
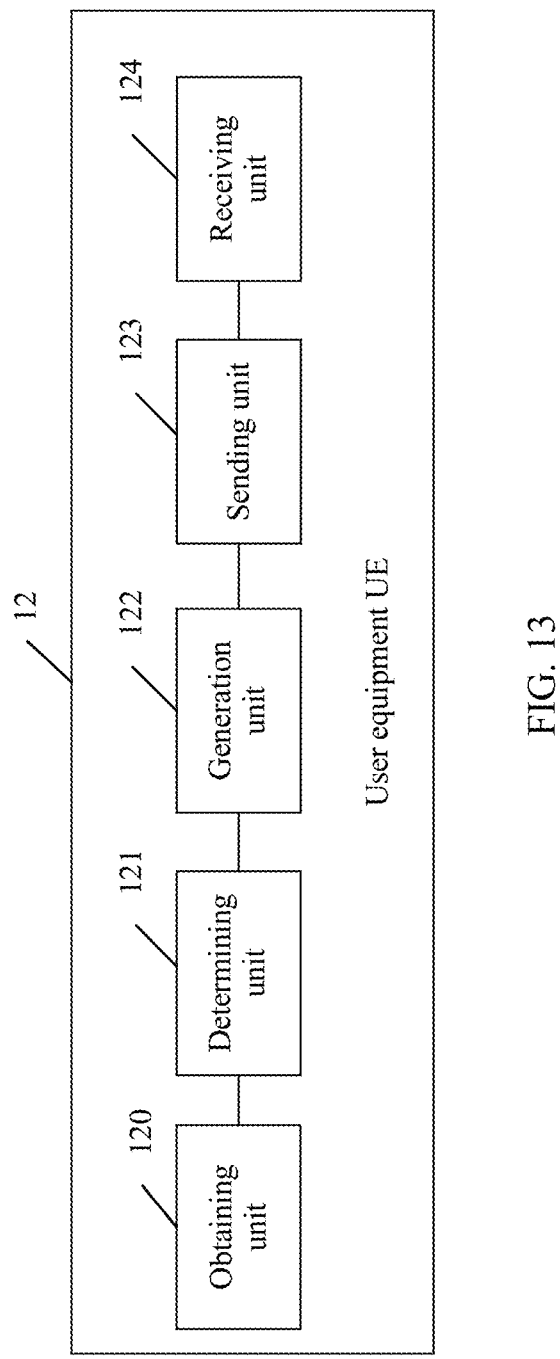

When an integrated unit is used, FIG. 13 is a possible schematic structural diagram of user equipment in the foregoing embodiments. The user equipment 12 includes an obtaining unit 120, a determining unit 121, a generation unit 122, a sending unit 123, and a receiving unit 124. The obtaining unit 120, the determining unit 121, the generation unit 122, the sending unit 123, and the receiving unit 124 each are configured to perform related steps described in this specification. For example, the obtaining unit 120 is configured to obtain retained information that is of the UE and that exists after the UE successfully accesses a network last time. The determining unit 121 is configured to determine access and mobility management function network element AMF indication information and a first security key based on the retained information of the UE. The generation unit 122 is configured to generate first authentication code based on the first security key. The sending unit 123 is configured to send a first request message to a non-3GPP interworking function network element N3IWF, where the first request message carries the first authentication code, the AMF indication information, and key identifier information, the first authentication code is used by the N3IWF to perform security authentication on the UE, and the key identifier information is used to obtain the first security key. The receiving unit 124 is configured to receive a first response message returned by the N3IWF based on the first request message. Optionally, another function unit may be added based on the structure.

Figure 14:
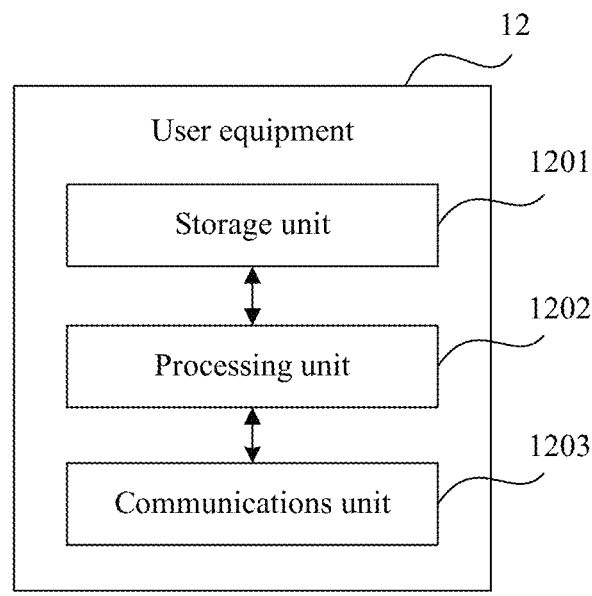

FIG. 14 is another possible schematic structural diagram of user equipment (UE) in the foregoing embodiments. The user equipment 12 includes a communications unit 1201, a processing unit 1202, and a storage unit 1203. The communications unit 1201 is configured to support the user equipment in sending information to or receiving information from a 3GPP-network access network, a non-3GPP-network access network, or a WLAN access point in the foregoing embodiments. The processing unit 1202 further performs processing processes of the user equipment in FIG. 4A to FIG. 11 and/or other technical processes described in this application. For example, the processing unit 1202 is configured to support the user equipment in performing the processes S102 and S106 to S108 in FIG. 4A and FIG. 4B and/or other technical processes described in this specification. The storage unit 1203 is configured to store program code and data of the user equipment.

It should be noted that, in this embodiment of the present invention, unit division is an example, and is merely a logical function division. In actual implementation, there may be another division manner. Function units in the embodiments of the present invention may be integrated into one processing unit, or each of the units may exist alone physically, or two or more units may be integrated into one unit. For example, in the foregoing embodiment, the receiving unit and the sending unit may be a same unit or different units. The integrated unit may be implemented in a form of hardware, or may be implemented in a form of a software function unit.

It should be noted that, for specific implementation of the user equipment shown in FIG. 12 to FIG. 14, refer to corresponding descriptions in the method embodiments in FIG. 4A to FIG. 11. Details are not described herein again.

Figure 15:
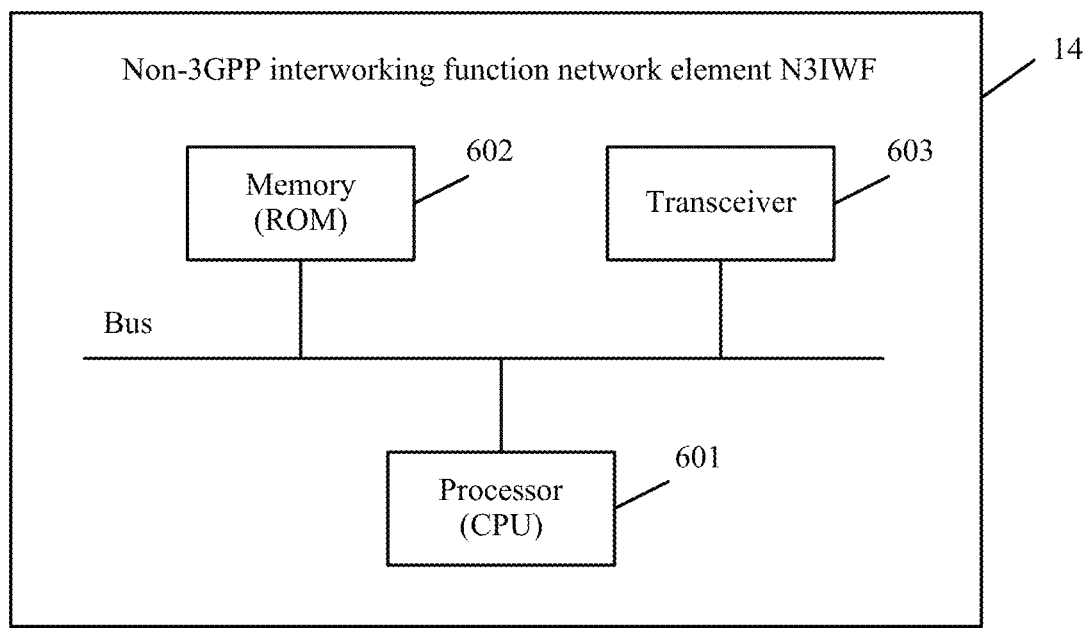
FIG. 15 to FIG. 17 are schematic structural diagrams of several non-3GPP interworking function network elements N3IWFs according to an embodiment of the present invention.

FIG. 15 is a schematic structural diagram of a non-3GPP interworking function network element according to an embodiment of the present invention. As shown in FIG. 15, the non-3GPP interworking function network element 14 includes a transceiver 601, a memory 602, and a processor 603 (there may be one or more processors 603, and one processor is used as an example in FIG. 14). In some embodiments of the present invention, the transceiver 601, the memory 602, and the processor 603 may be connected by using a bus or in another manner, and that a bus connection is used as an example in FIG. 15. The processor 603 invokes a program that is in the memory 602 and that is used to perform network access authentication based on a non-3GPP network, to perform the following operations:

receive, by using the transceiver, a first request message sent by UE, where the first request message carries first authentication code, AMF indication information, and key identifier information;

send, by using the transceiver, the key identifier information to a first AMF indicated by the AMF indication information, and receive, by using the transceiver, the first security key corresponding to the key identifier information;

generate first verification code based on the first security key; and if the first authentication code matches the first verification code, send a first response message to the UE by using the transceiver.

In some optional solutions, the processor is further configured to: generate second authentication code based on the first security key; and send the second authentication code to the UE by using the transceiver, where the second authentication code is used by the UE to perform security authentication on the N3IWF.

In some optional solutions, that the processor sends, by using the transceiver, the key identifier information to a first AMF indicated by the AMF indication information is specifically: searching for the first AMF based on the AMF indication information; and sending a second request message to the first AMF, where the second request message carries the key identifier information; and that the processor receives, by using the transceiver, the first security key corresponding to the key identifier information is specifically: receiving, by using the transceiver, the first security key sent by the first AMF.

In some optional solutions, that the processor sends, by using the transceiver, the key identifier information to a first AMF indicated by the AMF indication information is specifically:

when the first AMF indicated by the AMF indication information is not found, sending a third request message to a second AMF, so that the second AMF sends a second request message to the first AMF, where the second request message and the third request message each carry the key identifier information, and the second request message is used to obtain the first security key for verifying the first authentication code; and that the processor receives, by using the transceiver, the first security key corresponding to the key identifier information is specifically: receiving, by using the transceiver, the first security key sent by the second AMF, where the first security key is determined by the first AMF based on the key identifier information, or the first security key is generated by the second AMF based on received information that is about the first security key and that is sent by the first AMF, and the information about the first security key includes a derivation parameter used to derive the first security key.

In some optional solutions, that the processor sends, by using the transceiver, the key identifier information to a first AMF indicated by the AMF indication information is specifically: when the first AMF indicated by the AMF indication information is not found, sending a third request message to a second AMF, so that the second AMF sends a second request message to the first AMF, where the second request message and the third request message each carry the key identifier information, and the second request message is used to obtain the first security key for verifying the first authentication code. The processor is further configured to:

receive, by using the transceiver, redirection instruction information sent by the first AMF by using the second AMF, where the redirection instruction information carries address information of the first AMF, and the redirection instruction information is used to instruct the N3IWF to resend a second request message to the first AMF; and send, based on the redirection instruction information, the second request message to the first AMF corresponding to the address information; and that the processor receives, by using the transceiver, the first security key corresponding to the key identifier information specifically includes: receiving, by using the transceiver, the first security key sent by the first AMF.

In some optional solutions, after the processor sends the first response message to the UE by using the transceiver, the processor is further configured to: receive, by using the transceiver, a fourth request message sent by the UE, where the fourth request message is carried in the Internet protocol security IPsec protocol, the fourth request message carries third authentication code and the key identifier information, and the third authentication code is used by the first AMF to perform security authentication on the UE; send the fourth request message to the first AMF by using the transceiver, and receive a fourth response message returned by the first AMF based on the fourth request message, where the fourth request message and the fourth response message are carried in the NG2 protocol; and send the fourth response message to the UE by using the transceiver, where the fourth request message is carried in the Internet protocol security IPsec protocol, and the fourth response message is used to indicate that registration of the UE succeeds.

In some optional solutions, the first request message further carries third authentication code, the third authentication code is used by the first AMF to perform security authentication on the UE, and the processor is further configured to send the third authentication code to the first AMF by using the transceiver.

In some optional solutions, the key identifier information is used to identify security context information of the UE, and the first security key is a NAS integrity key in the security context information.

In some optional solutions, the key identifier information is used to identify security context information of the UE, the second request message further carries a first fresh protection parameter, and the first security key is a key derived based on a security key in the security context information and the first fresh protection parameter.

In some optional solutions, the security key includes a key Kseaf or a key Kamf, and the first fresh protection parameter includes any one of the following: a count value of a counter, a first random number, and a UE temporary identifier.

In some optional solutions, the AMF indication information is used to indicate the first AMF that performs mutual security authentication with the UE, and the AMF indication information includes the UE temporary identifier or NAI information generated based on the UE temporary identifier.

In some optional solutions, the key identifier information includes the UE temporary identifier and/or a key identifier in the security context information of the UE.

Figure 16:
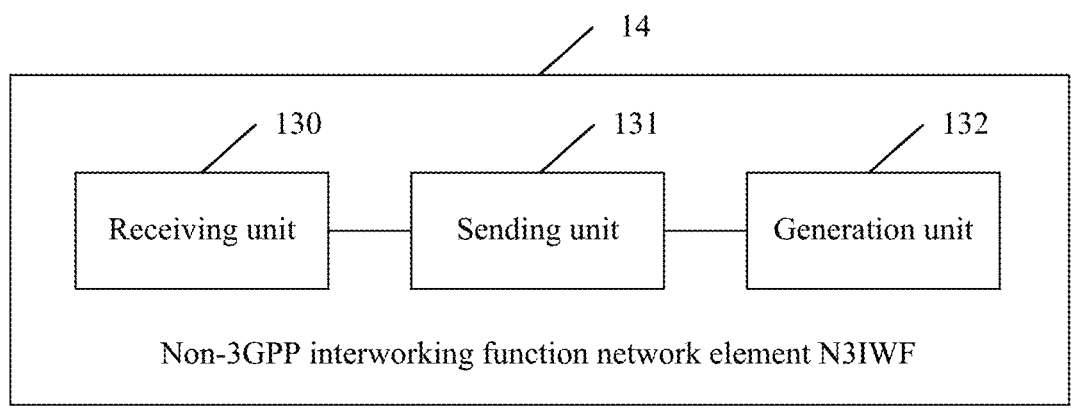

When an integrated unit is used, FIG. 16 is a possible schematic structural diagram of a non-3GPP interworking function network element in the foregoing embodiments.

The non-3GPP interworking function network element 14 includes a receiving unit 130, a sending unit 131, and a generation unit 132. The receiving unit 130, the sending unit 131, and the generation unit 132 each are configured to perform related steps described in this specification. For example, the receiving unit 130 is configured to receive a first request message sent by UE, where the first request message carries first authentication code, AMF indication information, and key identifier information. The sending unit 131 is configured to: send the key identifier information to a first AMF indicated by the AMF indication information, and receive the first security key corresponding to the key identifier information. The generation unit 132 is configured to generate first verification code based on the first security key. The sending unit 131 is further configured to: if the first authentication code matches the first verification code, send a first response message to the UE by using the transceiver. Optionally, another function unit may be added based on the structure.

Figure 17:
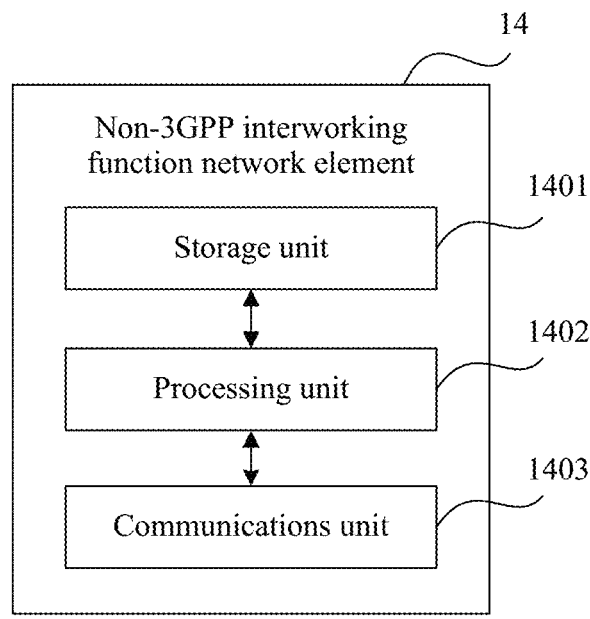

FIG. 17 is another possible schematic structural diagram of a non-3GPP interworking function network element (N3IWF) in the foregoing embodiments. The non-3GPP interworking function network element 14 includes a communications unit 1401, a processing unit 1402, and a storage unit 1403. The communications unit 1401 is configured to support the non-3GPP interworking function network element in sending information to or receiving information from user equipment, a core network network element (for example, an AMF) in a non-3GPP-network access network, and a WLAN access point in the foregoing embodiments. The processing unit 1402 further performs processing processes of the user equipment in FIG. 4A to FIG. 11 and/or other technical processes described in this application. For example, the processing unit 1402 is configured to support the non-3GPP interworking function network element in performing the processes S103 to S105 in FIG. 4A and/or other technical processes described in this specification. The storage unit 1403 is configured to store program code and data of the non-3GPP interworking function network element.

It should be noted that, in this embodiment of the present invention, unit division is an example, and is merely a logical function division. In actual implementation, there may be another division manner. Function units in the embodiments of the present invention may be integrated into one processing unit, or each of the units may exist alone physically, or two or more units may be integrated into one unit. For example, in the foregoing embodiment, the receiving unit and the sending unit may be a same unit or different units. The integrated unit may be implemented in a form of hardware, or may be implemented in a form of a software function unit.

It should be noted that, for specific implementation of the non-3GPP interworking function network element shown in FIG. 16 and FIG. 17, refer to corresponding descriptions in the method embodiments in FIG. 4A to FIG. 11. Details are not described herein again.

Figure 18:
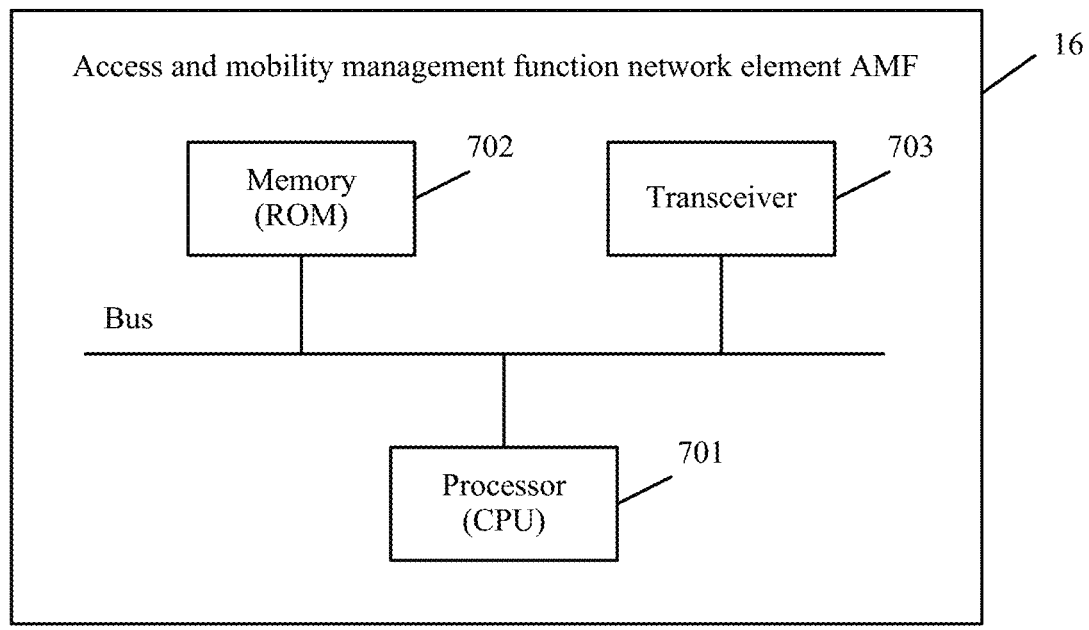
FIG. 18 to FIG. 20 are schematic structural diagrams of several access and mobility management function network elements AMFs according to an embodiment of the present invention.

FIG. 18 is a schematic structural diagram of an access and mobility management function network element according to an embodiment of the present invention. As shown in FIG. 18, the access and mobility management function network element 16 includes a transceiver 701, a memory 702, and a processor 703 (there may be one or more processors 703, and one processor is used as an example in FIG. 16). In some embodiments of the present invention, the transceiver 701, the memory 702, and the processor 703 may be connected by using a bus or in another manner, and that a bus connection is used as an example in FIG. 18. The processor 703 invokes a program that is in the memory 702 and that is used to perform network access authentication based on a non-3GPP network, to perform the following operations:

receive, by using the transceiver, a second request message sent by an N3IWF, where the second request message carries key identifier information;

determine a first security key based on the key identifier information; and send a second response message to the N3IWF by using the transceiver, where the second response message carries the first security key.

In some optional solutions, that the processor receives, by using the transceiver, a second request message sent by an N3IWF is specifically: receiving, by using the transceiver, a second request message sent by a second AMF, where the second request message is sent by the second AMF based on a received third request message sent by the N3IWF; and that the processor sends a second response message to the N3IWF by using the transceiver is specifically: sending a third response message to the second AMF, so that the second AMF sends a second response message to the N3IWF, where the second response message and the third response message each carry the first security key.

In some optional solutions, that the processor receives, by using the transceiver, a second request message sent by an N3IWF is specifically: receiving, by using the transceiver, a second request message sent by a second AMF, where the second request message is sent by the second AMF based on a received third request message sent by the N3IWF. Before the processor sends the second response message to the N3IWF by using the transceiver, the processor is further configured to: send redirection instruction information to the N3IWF by using the transceiver and the second AMF, where the redirection instruction information is used to instruct the N3IWF to send the second request message to the first AMF; and receive, by using the transceiver, the second request message sent by the N3IWF based on the redirection instruction information.

In some optional solutions, the key identifier information is used to identify security context information of the UE, and the first security key is a NAS integrity key in the security context information.

In some optional solutions, the key identifier information is used to identify security context information of the UE, the second request message further carries a first fresh protection parameter, and the first security key is a key derived based on a security key in the security context information and the first fresh protection parameter.

In some optional solutions, the security key includes a key Kseaf or a key Kamf, and the first fresh protection parameter includes any one of the following: a count value of a counter, a first random number, and a UE temporary identifier.

In some optional solutions, after the processor sends the second response message to the N3IWF by using the transceiver, the processor is further configured to: receive, by using the transceiver, a fourth request message sent by the N3IWF, where the fourth request message carries third authentication code and the key identifier information, and the third authentication code is used by the first AMF to perform security authentication on the UE; determine a NAS integrity key based on the key identifier information; and generate third verification code based on the NAS integrity key.

If the third verification code matches the third authentication code, the processor 701 is configured to send a fourth response message to the N3IWF by using the transceiver, where the fourth response message is used to indicate that registration of the UE succeeds.

In some optional solutions, the second request message further carries third authentication code, and before determining the first security key based on the key identifier information, the processor is further configured to: determine a NAS integrity key based on the key identifier information; generate third verification code based on the NAS integrity key; and if the third verification code matches the third authentication code, perform the step of determining a first security key based on the key identifier information.

Figure 19:
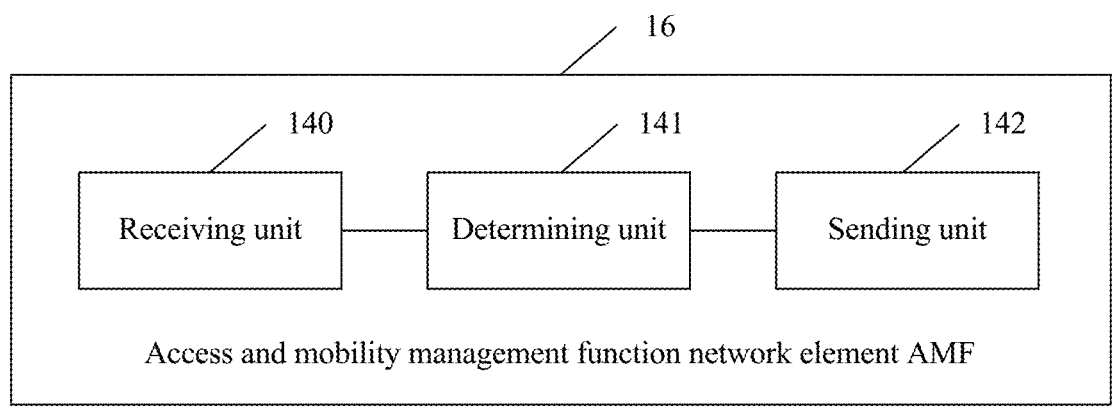

When an integrated unit is used, FIG. 19 is a possible schematic structural diagram of an access and mobility management function network element in the foregoing embodiments. The access and mobility management function network element 16 includes a receiving unit 140, a determining unit 141, and a sending unit 132. The receiving unit 140, the determining unit 141, and the sending unit 132 each are configured to perform related steps described in this specification. For example, the receiving unit 140 is configured to receive a second request message sent by an N3IWF, where the second request message carries key identifier information. The determining unit 141 is configured to determine a first security key based on the key identifier information. The sending unit 132 is configured to send a second response message to the N3IWF, where the second response message carries the first security key. Optionally, another function unit may be added based on the structure.

Figure 20:
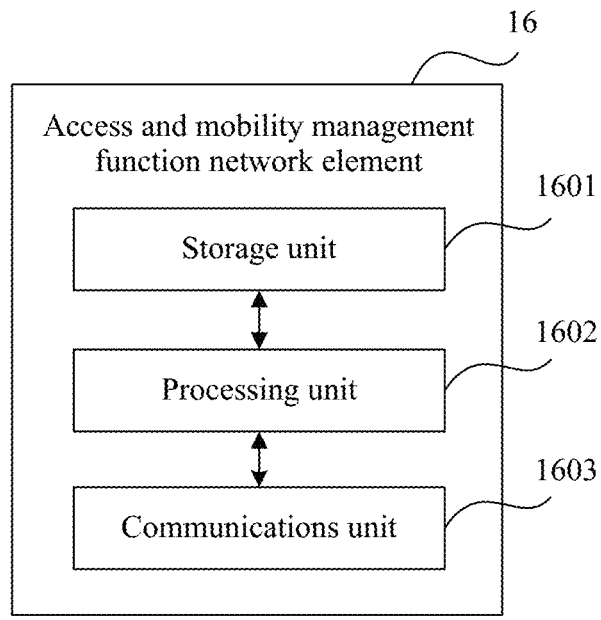

FIG. 20 is another possible schematic structural diagram of an access and mobility management function network element (AMF) in the foregoing embodiments. The access and mobility management function network element 16 includes a communications unit 1601, a processing unit 1602, and a storage unit 1603. The communications unit 1601 is configured to support the access and mobility management function network element in sending information to or receiving information from user equipment and some function network elements (for example, an N3IWF) in a non-3GPP-network access network in the foregoing embodiments. The processing unit 1602 further performs processing processes of the user equipment in FIG. 4A to FIG. 11 and/or other technical processes described in this application. For example, the processing unit 1602 is configured to support the non-3GPP interworking function network element in performing the processes S202 and S203 in FIG. 5 and/or other technical processes described in this specification. The storage unit 1603 is configured to store program code and data of the access and mobility management function network element.

It should be noted that, in this embodiment of the present invention, unit division is an example, and is merely a logical function division. In actual implementation, there may be another division manner. Function units in the embodiments of the present invention may be integrated into one processing unit, or each of the units may exist alone physically, or two or more units may be integrated into one unit. For example, in the foregoing embodiment, the receiving unit and the sending unit may be a same unit or different units. The integrated unit may be implemented in a form of hardware, or may be implemented in a form of a software function unit.

It should be noted that, for specific implementation of the access and mobility management function network element shown in FIG. 18 to FIG. 20, refer to corresponding descriptions in the method embodiments in FIG. 4A to FIG. 11. Details are not described herein again.

Figure 21:
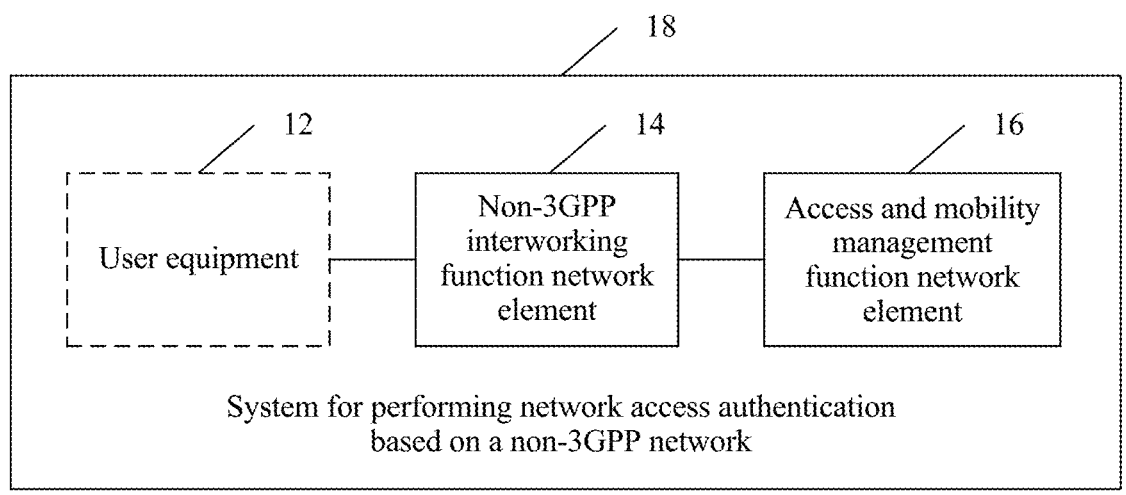
FIG. 21 is a schematic structural diagram of a system for performing network access authentication based on a non-3GPP network according to an embodiment of the present invention.

FIG. 21 is a schematic structural diagram of a system for performing network access authentication based on a non-3GPP network according to an embodiment of the present invention. The system 18 includes a non-3GPP interworking function network element 14 and an access and mobility management function network element 16.

The non-3GPP interworking function network element 14 may be the non-3GPP interworking function network element described in any one of the embodiments in FIG. 15 to FIG. 17. Details are not described herein again.

The access and mobility management function network element 16 may be the access and mobility management function network element described in any one of the embodiments in FIG. 18 to FIG. 20. Details are not described herein again.

In some optional solutions, the system further includes user equipment 12. The user equipment 12 may be the user equipment described in any one of the embodiments in FIG. 12 to FIG. 14. Details are not described herein again.

After the embodiments of the present invention are implemented, steps in a prior-art procedure in which the UE currently performs network access authentication based on non-3GPP after the UE successfully accesses a network last time can be reduced, and a network access authentication time can be reduced, so that the UE can quickly access the network.

A person of ordinary skill in the art may understand that all or some of the processes of the methods in the embodiments may be implemented by a computer program instructing related hardware. The program may be stored in a computer readable storage medium. When the program runs, the processes of the methods in the embodiments may be performed. The foregoing storage medium includes any medium that can store program code, such as a ROM, a RAM, a magnetic disk, or an optical disc.

What is claimed is:

1. A user equipment, wherein the user equipment comprises a processor, a memory, and a transceiver, the memory is configured to store program code used to perform network access authentication based on a non-3GPP network, and the processor is configured to invoke the program code to perform the following operations:
    obtaining retained information that is of the UE and that exists after the UE successfully accesses a network a last time;
    determining access and mobility management function network element (AMF) indication information and a first security key based on the retained information of the UE;
    generating a first authentication code based on the first security key;
    sending a first request message to a non-3GPP interworking function network element (N3IWF) using the transceiver, wherein the first request message carries the first authentication code, the AMF indication information, and key identifier information, wherein the first authentication code is used by the N3IWF to perform security authentication on the UE, and wherein the key identifier information is used to obtain the first security key; and
    receiving, using the transceiver, a first response message returned by the N3IWF based on the first request message.

2. The user equipment according to claim 1, wherein the first response message carries a second authentication code, the second authentication code is generated by the N3IWF based on the first security key, and the processor is further configured invoke the program code to:

generate a second verification code based on the first security key; and when the second verification code matches the second authentication code, determine that security authentication performed by the UE on the N3IWF succeeds.

3. The user equipment according to claim 1, wherein the retained information of the UE comprises security context information, and the first security key is a key derived based on a security key in the security context information and a first fresh protection parameter.

4. The user equipment according to claim 1, wherein the security key comprises a key Kseaf or a key Kamf, and the first fresh protection parameter comprises any one of the following: a count value of a counter, a first random number, and a UE temporary identifier.

5. The user equipment according to claim 1, wherein the AMF indication information is used to indicate a first AMF that performs mutual security authentication with the UE, and the AMF indication information comprises the UE temporary identifier or network access identifier NAI information generated based on the UE temporary identifier.

6. The user equipment according to claim 1, wherein the key identifier information comprises the UE temporary identifier and/or a key identifier in the security context information of the UE.

7. The user equipment according to claim 1, wherein the first request message further carries a third authentication code, and the third authentication code is used by the first AMF to perform security authentication on the UE.

8. A method for performing network access authentication based on a non-3GPP network, wherein the method comprises:

obtaining, by a user equipment (UE), retained information that is of the UE and that exists after the UE successfully accesses a network a last time;

determining access and mobility management function network element (AMF) indication information and a first security key based on the retained information of the UE;

generating a first authentication code based on the first security key;

sending a first request message to a non-3GPP interworking function network element (N3IWF), wherein the first request message carries the first authentication code, the AMF indication information, and key identifier information, wherein the first authentication code is used by the N3IWF to perform security authentication on the UE, and wherein the key identifier information is used to obtain the first security key; and receiving a first response message returned by the N3IWF based on the first request message.

\* \* \* \* \*